US011961965B2

(12) United States Patent
Manthiram et al.

(10) Patent No.: US 11,961,965 B2
(45) Date of Patent: Apr. 16, 2024

(54) ELECTROLYTES AND ELECTROCHEMICAL DEVICES

(71) Applicant: BOARD OF REGENTS, THE UNIVERSITY OF TEXAS SYSTEM, Austin, TX (US)

(72) Inventors: Arumugam Manthiram, Austin, TX (US); Wangda Li, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 328 days.

(21) Appl. No.: 16/607,820

(22) PCT Filed: Apr. 25, 2018

(86) PCT No.: PCT/US2018/029296
§ 371 (c)(1),
(2) Date: Oct. 24, 2019

(87) PCT Pub. No.: WO2018/200631
PCT Pub. Date: Nov. 1, 2018

(65) Prior Publication Data
US 2020/0203765 A1   Jun. 25, 2020

Related U.S. Application Data

(60) Provisional application No. 62/489,502, filed on Apr. 25, 2017.

(51) Int. Cl.
*H01M 10/0567* (2010.01)
*H01M 4/58* (2010.01)
(Continued)

(52) U.S. Cl.
CPC ..... *H01M 10/0567* (2013.01); *H01M 4/5825* (2013.01); *H01M 10/0525* (2013.01);
(Continued)

(58) Field of Classification Search
CPC ......... H01M 10/0567; H01M 10/0525; H01M 10/0568; H01M 10/0569; H01M 4/5825; H01M 4/525; H01M 2300/0034
See application file for complete search history.

(56) References Cited

U.S. PATENT DOCUMENTS 9,577,287 B2    2/2017  Ward et al.
2004/0106047 A1  6/2004  Mie et al.
(Continued)

FOREIGN PATENT DOCUMENTS

WO    2016117276 A1   7/2016

OTHER PUBLICATIONS

International Preliminary Report on Patentability dated Nov. 7, 2019 in International Application No. PCT/US18/29296 (6 pages).
(Continued)

*Primary Examiner* — Jimmy Vo
(74) *Attorney, Agent, or Firm* — Kilpatrick Townsend & Stockton LLP

(57) ABSTRACT

Disclosed herein are electrolytes and electrochemical devices. The electrochemical devices comprise cathodes that include nickel-rich layered lithium transition metal oxides, lithium-rich layered transition-metal oxides, lithium manganese-based spinel oxides, lithium polyanion-based compounds, and combinations thereof. The electrolytes include a lithium imide salt, an aprotic acyclic carbonate solvent, and an additive, wherein the additive comprises a metal salt, an aprotic solvent, or a combination thereof. The electrolyte can be stable at a voltage of 4.3 V or above vs. Li/Li+.

27 Claims, 20 Drawing Sheets

(51) Int. Cl.
*H01M 10/0525* (2010.01)
*H01M 10/0568* (2010.01)
*H01M 10/0569* (2010.01)
*H01M 4/525* (2010.01)

(52) U.S. Cl.
CPC ... *H01M 10/0568* (2013.01); *H01M 10/0569* (2013.01); *H01M 4/525* (2013.01); *H01M 2300/0034* (2013.01)

(56) References Cited

U.S. PATENT DOCUMENTS

| | | | | |
|---|---|---|---|---|
| 2009/0305136 | A1* | 12/2009 | Yada | H01M 4/505 429/223 |
| 2012/0258357 | A1 | 10/2012 | Kim et al. | |
| 2012/0308881 | A1* | 12/2012 | Tokuda | H01M 10/056 429/199 |
| 2014/0087263 | A1* | 3/2014 | Matsumoto | C01G 45/1228 429/223 |
| 2014/0134501 | A1 | 5/2014 | Li et al. | |
| 2014/0272605 | A1 | 9/2014 | Lim et al. | |
| 2014/0342241 | A1 | 11/2014 | Lim et al. | |
| 2015/0333373 | A1 | 11/2015 | Ho et al. | |
| 2016/0087307 | A1 | 3/2016 | Burkhardt et al. | |
| 2016/0099484 | A1 | 4/2016 | Abraham et al. | |
| 2016/0149263 | A1 | 5/2016 | Hallac et al. | |
| 2016/0301104 | A1 | 10/2016 | Shi et al. | |
| 2016/0336615 | A1 | 11/2016 | Thillaiyan et al. | |
| 2017/0338471 | A1 | 11/2017 | Zheng et al. | |
| 2018/0013145 | A1* | 1/2018 | Choi | C01G 53/42 |
| 2018/0062204 | A1 | 3/2018 | Takahashi et al. | |

OTHER PUBLICATIONS

Ma et al. A guide to ethylene carbonate-free electrolyte making for Li-ion cells. J Electrochem Soc. 2017, 164, A5008-A5018.

Park et al. Comparative study on lithium borates as corrosion inhibitors of aluminum current collectors in lithium bis(fluorosulfonyl)imide electrolytes. J Power Sources, 2015, 296, 197-203.

Petibon et al. Electrolyte system for high voltage Li-Ion cells. J. Electrochem Soc, 2016, 163, A2571-A2578.

Wang et al. Superconcentrated electrolytes for a high-voltage lithium-ion battery. Nat Commun. 2016, 7, 12032.

Xu. Electrolytes and interphases in Li-ion batteries and beyond. Chem Rev. 2014, 114, 11503-11618.

International Search Report and Written Opinion in PCT/US2018/029296. dated Jul. 13, 2018. 8 pages.

* cited by examiner

ELECTROLYTES AND ELECTROCHEMICAL DEVICES

CROSS-REFERENCE TO RELATED APPLICATIONS

This application is a national stage application filed under 35 U.S.C. § 371 of PCT/US2018/029296 filed Apr. 25, 2018, which claims the benefit of priority to U.S. Provisional Application 62/489,502, filed Apr. 25, 2017, which are both hereby incorporated herein by reference in their entireties.

STATEMENT OF GOVERNMENT SUPPORT

This invention was made with government support under Grant No. DE-EE0007762 awarded by the Department of Energy. The government has certain rights in the invention.

BACKGROUND

Rechargeable lithium-ion batteries have attracted considerable interest as a desirable energy storage technology for electric vehicles. Nickel-rich layered lithium transition-metal oxides ($LiNi_{1-x}M_xO_2$, M=Co, Mn and Al; $x \leq 0.5$), with a gravimetric specific discharge capacity of >200 mA h g$^{-1}$, would bring an energy density boost of state-of-the-art lithium-ion cells to above 300 Wh kg$^{-1}$ EVs with 300-plus mile ranges in electric vehicles. Meanwhile, extending their operating voltage window ($\geq 4.5$ V vs. Li/Li$^+$) also achieves larger charge-storage capacities. However, these efforts introduce problems including inferior battery safety and service life. State-of-the-art commercial ethylene carbonate (EC) based electrolytes with lithium hexafluorophosphate (LiPF$_6$) as the conducting salt are intrinsically highly volatile under abuse conditions (overcharge, excess heat, etc.) and can react aggressively with delithiated nickel-rich $LiNi_{1-x}M_xO_2$, both during normal battery operation and abnormal heat accumulation.

Conventional approaches in addressing these challenges are either coating/doping of active cathode particles or the use of electrolyte additives. However, the above problems persist and there is a need to design alternative electrolyte combinations for practical use of high-Ni $LiNi_{1-x}M_xO_2$. The compositions and devices discussed herein address these and other needs.

On the other hand, the choice for anodes for commercial Li-ion batteries is limited almost exclusively to carbon (graphite), of which the reversible electrochemical operation crucially relies on the formation of a stable passivation film (e.g., a solid electrolyte interphase, SEI) at the electrode/electrolyte interface. However, the solid electrolyte interphase limits the lithiation/delithiation kinetics and prevents rapid charging of the battery. Under fast charging beyond certain threshold values, metallic lithium is plated in the form of dendrites or mosses at the surface of carbon anodes, which can induce short circuits and fire hazards. The cells also suffer from severe energy and power losses at low temperatures (especially below 0° C.), and drastically increased risks of anode lithium plating. Practical consequences of these processes are catastrophic and cycling a set of operating protocols needs to be strictly followed to avoid anode lithium deposition. As of now, there are very limited effective approaches to substantially enhance the fast charging capability of Li-ion cells. The compositions and devices discussed herein address these and other needs.

SUMMARY

In accordance with the purposes of the disclosed compositions and methods, as embodied and broadly described herein, the disclosed subject matter relates to compositions and devices. Specifically, electrolytes and electrochemical devices, for example with high operating voltage stability, are described herein.

The details of one or more embodiments of the invention are set forth in the accompanying drawings and the description below. Other features, objects, and advantages of the invention will be apparent from the description and drawings, and from the claims.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
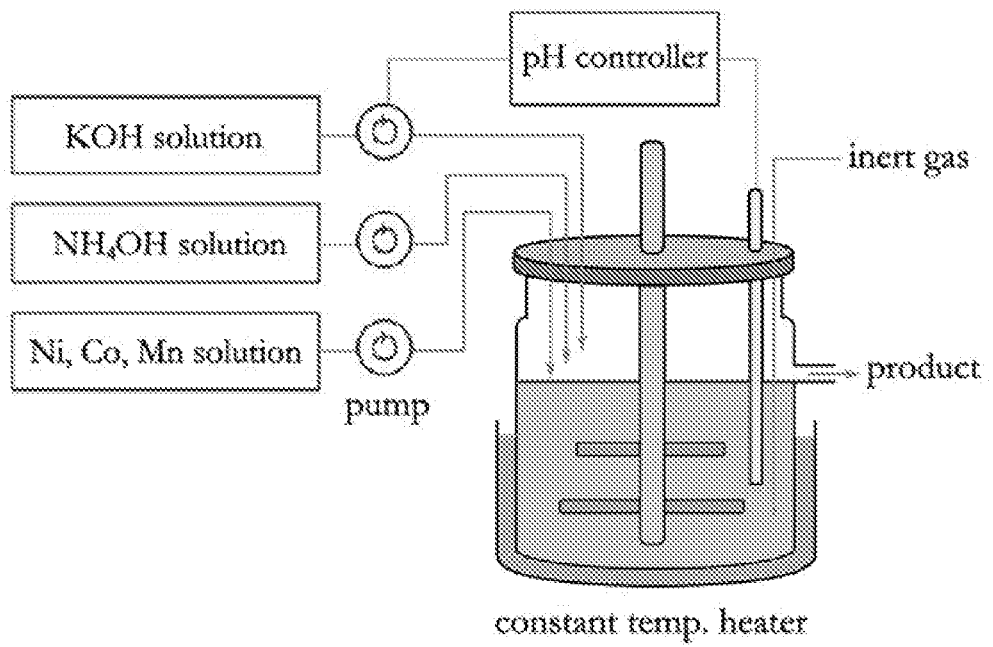
FIG. 1 is a schematic of the transition-metal co-precipitation method for the synthesis of the high-nickel $LiNi_{1-x}M_xO_2$ samples (e.g., $LiNi_{0.94}Co_{0.06}O_2$, $LiNi_{0.8}Co_{0.1}Mn_{0.1}O_2$, $LiNi_{0.8}Co_{0.15}Al_{0.05}O_2$, and other compositions) using a batch reactor.

The compositions and devices described herein may be understood more readily by reference to the following detailed description of specific aspects of the disclosed subject matter and the Examples included therein.

Before the present compositions and devices are disclosed and described, it is to be understood that all technical and scientific terminology utilized in the descriptions and claims herein has the same meaning as commonly understood to a person of ordinary skill in the art to which this disclosure belongs, unless defined otherwise. The aspects described below are not limited to specific methods or specific materials, as such may, of course, vary. It is also to be understood that the materials, methods, examples, and terminology used herein are for the purpose of describing particular aspects only and are not intended to be limiting.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like. The term "or" refers to a single element of stated alternative elements or a combination of two or more elements unless the context clearly dictates otherwise.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Electrolytes and Electrochemical Devices

Disclosed herein are electrolytes and electrochemical devices comprising the electrolytes. The electrochemical devices comprise a cathode, an anode, and an electrolyte, wherein the cathode is in electrical contact with the anode, and the cathode and the anode are in electrochemical contact with the electrolyte. The electrochemical devices can, for example, be used to produce a voltage or current via a chemical reaction, or, conversely, to produce a chemical reaction via application of a voltage or current.

The electrolytes described herein are non-aqueous liquid electrolytes. The electrolytes comprise a lithium imide salt, an aprotic acyclic carbonate solvent, and an additive, wherein the additive comprises a metal salt, an aprotic solvent, or a combination thereof. The electrolyte can, for example, support stable operation of high-performance electrochemical devices. In some examples, the lithium imide salt and aprotic acyclic carbonate solvent can comprise the skeleton composition of the electrolyte. In some examples, the electrolytes are stable at a voltage of 4.3 V or above vs. $Li/Li^+$.

Examples of lithium imide salts include, but are not limited to, lithium bis(trifluoromethanesulfonyl)imide (LiTFSI), lithium bis(fluorosulfonyl)imide (LiFSI), lithium bis(fluorosulfonyl)imide (LiBETI) and lithium (fluorosulfonyl)(nonafluorobutanesulfonyl)imide (LiFNSI), lithium oligometric fluorosulfonyl imide, and combinations thereof. In some examples, the lithium imide salt comprises lithium bis(fluorosulfonyl)imide. In some examples, the lithium imide salt consists essentially of lithium bis(fluorosulfonyl)imide. In some examples, the lithium imide salt consists of lithium bis(fluorosulfonyl)imide.

The lithium imide salt can, for example, comprise 1% by weight of the electrolyte or more (e.g., 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, 25% or more, 30% or more, 35% or more, 40% or more, 45% or more, 50% or more, 55% or more, 60% or more, 65% or more, 70% or more, 75% or more, 80% or more, or 85% or more). In some examples, the lithium imide salt comprises 90% by weight of the electrolyte or less (e.g., 85% or less, 80% or less, 75% or less, 70% or less, 65% or less, 60% or less, 55% or less, 50% or less, 45% or less, 40% or less, 35% or less, 30% or less, 25% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, or 2% or less). The amount of the lithium imide salt in the electrolyte can range from any of the minimum values described above to any of the maximum values described above. For example, the lithium imide salt can comprise from 1% to 90% by weight of the electrolyte (e.g., from 1% to 45%, from 45% to 90%, from 1% to 65%, from 1% to 30%, from 30% to 65%, from 1% to 10%, from 10% to 20%, from 20% to 30% from 30% to 40%, from 40% to 50%, from 50% to 65%, from 10% to 50%, or from 50% to 90%).

The aprotic acyclic carbonate solvent can be any aprotic acyclic carbonate solvent with a low viscosity and a low melting temperature. In some examples, the aprotic acyclic carbonate solvent can have a viscosity of 2.0 mPa s or less at 25° C. (e.g., 1.9 mPa s or less, 1.8 mPa s or less, 1.7 mPa s or less, 1.6 mPa s or less, 1.5 mPa s or less, 1.4 mPa s or less, 1.3 mPa s or less, 1.2 mPa s or less, 1.1 mPa s or less, 1.0 mPa s or less, 0.9 mPa s or less, 0.8 mPa s or less, 0.7 mPa s or less, 0.6 mPa s or less, 0.5 mPa s or less, 0.4 mPa s or less, 0.3 mPa s or less, 0.2 mPa s or less, or 0.1 mPa s or less). In some examples, the aprotic acyclic carbonate solvent can have a melting temperature of 20° C. or less (e.g., 10° C. or less, 0° C. or less, −10° C. or less, −20° C.

or less, −30° C. or less, −40° C. or less, −50° C. or less, −60° C. or less, −70° C. or less, or −80° C. or less).

Examples of suitable aprotic acyclic carbonate solvents include, but are not limited to, ethyl methyl carbonate (EMC), diethyl carbonate (DEC), dimethyl carbonate (DMC), methyl propyl carbonate (MPC), dipropyl carbonate (DPC), methyl-2,2,2-trifluoroethyl carbonate (MTFEC), ethyl-2,2,2-trifluoroethyl carbonate (ETFEC), propyl-2,2,2-trifluoroethyl carbonate (PTFEC), di-2,2,2-trifluoroethyl carbonate (DTFEC), and combinations thereof. In some examples, the aprotic acyclic carbonate solvent comprises ethyl methyl carbonate. In some examples, the aprotic acyclic carbonate solvent consists essentially of ethyl methyl carbonate. In some examples, the aprotic acyclic carbonate solvent consists of ethyl methyl carbonate.

In some examples, the additive comprises a metal salt. For example, the metal salt can comprise a metal selected from the group consisting of Li, Na, K, Cs, Mg, Al, Zn, Ca, and combinations thereof. In some examples, the metal salt can comprise a metal borate salt, a metal phosphate salt, a metal aluminate salt, a metal arsenate salt, a metal antimonite salt, or a combination thereof.

In some examples, the additive comprises a lithium borate salt. Examples of lithium borate salts include, but are not limited to, lithium tetrafluoroborate ($LiBF_4$), lithium bis(oxalato)borate (LiBOB), lithium difluoro(oxalato)borate (LiDFOB), lithium perfluoroethyl trifluoroborate (LiFAB), lithium (malonatooxalato)borate (LiMOB), lithium tetracyanoborate ($LiB(CN)_4$), lithium bis(polyfluorodiolato)borate, and combinations thereof. In some examples, the lithium borate salt comprises lithium difluoro(oxalate)borate.

In some examples, the additive comprises a metal salt comprising lithium hexafluorophosphate ($LiPF_6$), sodium hexafluorophosphate ($NaPF_6$), potassium hexafluorophosphate ($KPF_6$), cesium hexafluorophosphate ($CsPF_6$), lithium hexafluoroarsenate ($LiAsF_6$), lithium hexafluoroantimonate ($LiSbF_6$), lithium tris(oxalato)phosphate (LiTOP), lithium tetrafluoro(oxalato)phosphate (LiTFOP), lithium tris[1,2-benzenediolato(2-)-O,O']phosphate (LiTBP), or a combination thereof.

In some examples, the additive comprises a metal salt and the metal salt comprises 0.01% by weight of the electrolyte or more (e.g., 0.05% or more, 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, or 25% or more). In some examples, the additive comprises a metal salt and the metal salt comprises 30% by weight of the electrolyte or less (e.g., 29% or less, 28% or less, 27% or less, 26% or less, 25% or less, 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, 0.1% or less, or 0.05% or less). The amount of the metal salt in the electrolyte can range from any of the minimum values described above to any of the maximum values described above. For example, the additive can comprise a metal salt and the metal salt can comprise from 0.01% to 30% by weight of the electrolyte (e.g., from 0.01% to 15%, from 15% to 30%, from 0.01% to 5%, from 5% to 15%, from 15% to 20%, from 20% to 25%, from 25% to 30%, from 10% to 30%, or from 0.01% to 10%).

In some examples, the electrolyte comprises lithium hexafluorophosphate ($LiPF_6$) in an amount of 5% by weight of the electrolyte or less (e.g., 4.5% or less, 4% or less, 3.5% or less, 3% or less, 2.5% or less, 2% or less, 1.5% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, 0.1% or less, 0.05% or less, or 0.01% or less). In some examples, the electrolyte substantially excludes lithium hexafluorophosphate ($LiPF_6$).

In some examples, the additive can comprise an aprotic solvent. For example, the additive can comprise an aprotic solvent comprising a carbonate, a carboxylate, a sulfone, a nitrile, a phosphorus-based solvent (e.g., a phosphate, a phosphite), a silicon-based solvent (e.g., a siloxane, a silane), an ether, or a combination thereof. In some examples, the additive can comprise an aprotic solvent comprising ethylene carbonate (EC), propylene carbonate (PC), vinylene carbonate (VC), fluoroethylene carbonate (FEC), vinyl ethylene carbonate (VEC), methylene ethylene carbonate (MEC), tetrafluoroethylene carbonate (TFEC), trifluoropropylene carbonate (TFPC), γ-butyrolactone (GBL), methyl acetate (MA), ethyl acetate (EA), propylene acetate (PA), butyl acetate (BA), methyl propionate (MP), ethyl propionate (EP), methyl butyrate (MB), ethyl butyrate (EB), 1,2-dimethoxyethane (DME), tetrahydrofuran (THF), dioxlane (DOL), diglyme, triglyme, tetraglyme, dimethyl sulfide (DMS), dimethyl sulfoxide (DMSO), dimethyl formamide, dimethyl acetamide, tetramethylene sulfone (sulfolane), ethyl methyl sulfone (EMS), butyl sulfone (BS), ethyl vinyl sulfone (EVS), methyl-i-propyl sulfone (MiPS), ethyl-propyl sulfone (EiPS), acetonitrile (AN), butyronitrile, 3-methoxypropionitrile (MPN), 3-ethoxypropionitrile (EPN), succinonitrile (SCN), pimelonitrile (PMN), trimethyl phosphate, triethyl phosphate, tributyl phosphate, triphenyl phosphate, tris-2,2,2-trifluoroethyl phosphate, dimethyl methylphosphaphonate (DMMP), triphenyl phosphite, tris-2,2,2-trifluoroethyl phosphite, siloxanes, silanes, 2-trifluoromethyl-3-methoxyperfluoropentane (TMMP), ethyl propyl ether (EPE), nonafluorobutyl methyl ether, nonafluorobutyl ethyl ether, N-methyl pyrrolidinone (NMP), and combinations thereof.

In some examples, the additive comprises an aprotic solvent and the aprotic solvent can comprise 0.01% by weight of the electrolyte or more (e.g., 0.05% or more, 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 6% or more, 7% or more, 8% or more, 9% or more, 10% or more, 11% or more, 12% or more, 13% or more, or 14% or more). In some examples, the additive comprises an aprotic solvent and the aprotic solvent can comprise 15% by weight of the electrolyte or less (e.g., 14% or less, 13% or less, 12% or less, 11% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, 0.1% or less, or 0.05% or less). The amount of the aprotic solvent in the electrolyte can range from any of the minimum values described above to any of the maximum values described above. For example, the aprotic solvent can comprise from 0.01% to 15% by weight of the electrolyte (e.g., from 0.01% to 7%, from 7% to 15%, from 0.1% to 5%, from 5% to 10%, from 10% to 15%, or from 0.01% to 10%).

In some examples, the additive can comprise an aprotic solvent and the aprotic solvent can function as a co-solvent or a diluent in the electrolyte. In certain examples, the aprotic solvent can comprise 0.1% by weight of the electrolyte or more (e.g., 0.5% or more, 1% or more, 1.5% or more, 2% or more, 2.5% or more, 3% or more, 3.5% or more, 4% or more, 4.5% or more, 5% or more, 6% or more, 7% or more, 8% or more, 9% or more, 10% or more, 15% or more, 20% or more, 25% or more, 30% or more, 35% or more, 40% or more, 45% or more, 50% or more, 60% or more, 70% or more, 80% or more, or 90% or more). In some examples, the aprotic solvent can comprise 95% by weight of the electrolyte or less (e.g., 90% or less, 80% or less, 70% or less, 60% or less, 50% or less, 45% or less, 40% or less, 35% or less, 30% or less, 25% or less, 20% or less, 15% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, 1% or less, or 0.5% or less). The amount of the aprotic solvent in the electrolyte can range from any of the minimum values described above to any of the maximum values described above. For example, the aprotic solvent can comprise from 0.1% to 95% by weight of the electrolyte (e.g., from 0.1% to 50%, from 50% to 95%, from 0.1% to 20%, from 20% to 40%, from 40% to 60%, from 60% to 80%, from 80% to 95%, or from 5% to 90%).

In some examples, the electrolyte comprises a cyclic carbonate solvent in an amount of 10% by weight of the electrolyte or less (e.g., 9% or less, 8% or less, 7% or less, 6% or less, 5% or less, 4.5% or less, 4% or less, 3.5% or less, 3% or less, 2.5% or less, 2% or less, 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, 0.1% or less, 0.05% or less, or 0.01% or less). In some examples, the electrolyte substantially excludes cyclic carbonate solvents.

In some examples, the electrolyte substantially excludes ethylene carbonate, vinylene carbonate, or a combination thereof. In some examples, the electrolyte substantially excludes a sulfone.

In some examples, the electrolyte comprises lithium bis (fluorosulfonyl)imide, ethyl methyl carbonate, and a metal salt. In some examples, the electrolyte comprises a LiFSI/EMC-based electrolyte and lithium difluoro(oxalate)borate (LiDFOB) (e.g., 3% by weight), wherein the lithium difluoro(oxalate)borate (LiDFOB) can, for example, further support stable operation of high-performance electrochemical devices. In some examples, the electrolyte comprises a LiFSI-LiDFOB/EMC electrolyte and LiPF$_6$ (e.g., 0.5% by weight), wherein the LiPF$_6$ can, for example, further support stable operation of high-performance electrochemical devices.

In some examples, the electrolyte comprises lithium bis (fluorosulfonyl)imide, lithium difluoro(oxalate)borate, lithium hexafluorophosphate, and ethyl methyl carbonate. In some examples, the electrolyte consists essentially of lithium bis(fluorosulfonyl)imide, lithium difluoro(oxalate) borate, lithium hexafluorophosphate, and ethyl methyl carbonate. In some examples, the electrolyte consists of lithium bis(fluorosulfonyl)imide, lithium difluoro(oxalate)borate, lithium hexafluorophosphate, and ethyl methyl carbonate.

In some examples, the electrolyte comprises lithium bis (fluorosulfonyl)imide, lithium difluoro(oxalate)borate, and ethyl methyl carbonate. In some examples, the electrolyte consists essentially of lithium bis(fluorosulfonyl)imide, lithium difluoro(oxalate)borate, and ethyl methyl carbonate. In some examples, the electrolyte consists of lithium bis (fluorosulfonyl)imide (LiFSI), lithium difluoro(oxalate)borate, and ethyl methyl carbonate (EMC).

The cathode can comprise, for example, a nickel-rich layered lithium transition-metal oxide, a lithium-rich layered transition-metal oxide, a lithium manganese-based spinel oxide, a lithium polyanion-based compound, or a combination thereof.

In some examples, the cathode can comprise a nickel-rich layered lithium transition-metal oxide having a formula of $LiNi_{1-x}M_xO_2$ where M can be a metal, a nonmetal, or a combination thereof, and x is 0.5 or less (e.g., 0.45 or less, 0.4 or less, 0.35 or less, 0.3 or less, 0.25 or less, 0.24 or less, 0.23 or less, 0.22 or less, 0.21 or less, 0.2 or less, 0.19 or less, 0.18 or less, 0.17 or less, 0.16 or less, 0.15 or less, 0.14 or less, 0.13 or less, 0.12 or less, 0.11 or less, 0.1 or less, 0.09 or less, 0.08 or less, 0.06 or less, 0.05 or less, 0.04 or less, 0.03 or less, 0.02 or less, or 0.01 or less). In some examples, M is selected from Co, Mn, Al, Mg, Fe, Cr, B, Ti, Zr, Ga, Zn, V, Cu, Li, Na, K, F, and combinations thereof. In some examples, the nickel-rich layered lithium transition-metal oxide comprises $LiNi_{0.8}Co_{0.2}Mn_{0.3}O_2$, $LiNi_{0.8}Co_{0.25}Mn_{0.25}O_2$, $LiNi_{0.6}Co_{0.2}Mn_{0.2}O_2$, $LiNi_{0.6}Co_{0.15}Mn_{0.25}O_2$, $LiNi_{0.7}Co_{0.15}Mn_{0.15}O_2$, $LiNi_{0.7}Co_{0.1}Mn_{0.2}O_2$, $LiNi_{0.8}Co_{0.1}Mn_{0.1}O_2$, $LiNi_{0.85}Co_{0.05}Mn_{0.1}O_2$, $LiNi_{0.9}Co_{0.05}Mn_{0.05}O_2$, $LiNi_{0.5}Mn_{0.1}O_2$, $LiNi_{0.94}Co_{0.06}O_2$, $LiNi_{0.95}Co_{0.05}O_2$, $LiNi_{0.95}Co_{0.025}Mn_{0.025}O_2$, $LiNi_{0.9}Co_{0.1}O_2$, $LiNi_{0.92}Co_{0.06}Al_{0.02}O_2$, $LiNi_{0.9}Co_{0.05}Al_{0.05}O_2$, $LiNi_{0.82}Co_{0.15}Al_{0.03}O_2$, $LiNi_{0.88}Co_{0.1}Al_{0.02}O_2$, $LiNi_{0.8}Co_{0.15}Al_{0.05}O_2$, $LiNi_{0.92}Co_{0.06}Mg_{0.02}O_2$, $LiNiO_2$ or a combination thereof.

In some examples, the cathode can comprise a lithium-rich layered transition-metal oxide having a formula of $Li_{1+y}AlO_yO_2$, wherein A is a metal, a nonmetal, or a combination thereof, and y is from 0 to 0.5. In some examples, A is selected from Mn, Co, Ni, Ru, Ti, Sn, Ir, Nb, Fe, Sb, Zr, Te, Mo, Cr, Mg, Al, V, Ga, Zn, Cu, Y, Ce, Li, Na, K, F, and combinations thereof. In some examples, y is 0.5 or less (e.g., 0.4 or less, 0.3 or less, 0.2 or less, 0.15 or less, 0.1 or less, or 0.05 or less). In some examples, the lithium-rich layered transition-metal oxide can comprise $Li_{1.2}Ni_{0.2}Mn_{0.6}O_2$.

In some examples, the cathode can comprise a lithium manganese-based spinel oxide having a formula of $Li(Ni_{0.5-z}Mn_{1.5+z})_{1-n/2}B_nO_4$ where B is a metal, a nonmetal, or a combination thereof; $-0.5 \leq z \leq 0.5$; and $0 \leq n \leq 0.5$. In some examples, B is selected from Co, Al, Mg, Fe, Cr, B, Ti, Zr, Ga, Zn, V, Cu, Li, Na, K, F, and combinations thereof. In some examples, z is −0.5 or more (e.g., −0.4 or more, −0.3 or more, −0.25 or more, −0.2 or more, −0.15 or more, −0.1 or more, −0.075 or more, −0.05 or more, −0.025 or more, −0.01 or more, 0 or more, 0.01 or more, 0.025 or more, 0.05 or more, 0.075 or more, 0.1 or more, 0.15 or more, 0.2 or more, 0.3 or more, or 0.4 or more). In some examples, z is 0.5 or less (e.g., 0.4 or less, 0.3 or less, 0.2 or less, 0.15 or less, 0.1 or less, 0.075 or less, 0.05 or less, 0.025 or less, 0.01 or less, 0 or less, −0.01 or less, −0.025 or less, −0.05 or less, −0.075 or less, −0.1 or less, −0.15 or less, −0.2 or less, −0.25 or less, −0.3 or less, or −0.4 or less). In some examples, n is 0 or more (e.g., 0.005 or more, 0.01 or more, 0.02 or more, 0.03 or more, 0.04 or more, 0.05 or more, 0.06 or more, 0.08 or more, 0.1 or more, 0.12 or more, 0.15 or more, 0.18 or more, 0.2 or more, 0.25 or more, 0.3 or more, or 0.4 or more). In some examples, n is 0.5 or less (e.g., 0.4 or less, 0.3 or less, 0.25 or less, 0.2 or less, 0.18 or less, 0.15 or less, 0.12 or less, 0.1 or less, 0.08 or less, 0.06 or less, 0.05 or less, 0.04 or less, 0.03 or less, 0.02 or less, 0.01 or less, or 0.005 or less). In some examples, the lithium manganese spinel-based oxide can comprise a high-voltage spinel oxide.

The cathode can, for example, comprise a lithium polyanion-based compound selected from the group consisting of $LiFePO_4$, $LiCoPO_4$, $LiMnPO_4$, $LiNiPO_4$, $Li_3V_2(PO_4)_3$, $LiVOPO_4$, $LiVPO_4F$, $LiFeSO_4F$, $LiMnSO_4F$, $LiCoSO_4F$, $Li_2CoPO_4F$, $Li_2MnPO_4F$, $Li_2NiPO_4F$, $Li_2MnP_2O_7$, $Li_2CoP_2O_7$, $LiVP_2O_7$, $Li_2MnSiO_4$, $Li_2FeSiO_4$, and combinations thereof. In some examples, the lithium polyanion-based compound comprises a high-voltage lithium polyanion-based compound.

In some examples, the cathode can comprise a plurality of particles. The plurality of particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle.

For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

In some examples, the plurality of particles can have an average particle size of 0.1 micrometers (μm) or more (e.g., 0.15 μm or more, 0.2 μm or more, 0.25 μm or more, 0.3 μm or more, 0.35 μm or more, 0.4 μm or more, 0.45 μm or more, 0.5 μm or more, 0.6 μm or more, 0.7 μm or more, 0.8 μm or more, 0.9 μm or more, 1 μm or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, or 18 μm or more). In some examples, the plurality of particles can have an average particle size of 20 μm or less (e.g., 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, 0.9 μm or less, 0.8 μm or less, 0.7 μm or less, 0.6 μm or less, 0.5 μm or less, 0.4 μm or less, 0.3 μm or less, 0.25 μm or less, 0.2 μm or less, or 0.15 μm or less). The average particle size of the plurality of particles can range from any of the minimum values described above to any of the maximum values described above. For example, the plurality of particles can have an average particle size of from 0.1 μm to 20 μm (e.g. from 0.1 μm to 10 μm, from 10 μm to 20 μm, from 0.1 μm to 1 μm, from 1 μm to 5 μm, from 5 μm to 20 μm, from 0.1 μm to 12 μm, from 5 μm to 12 μm, from 2 μm to 20 μm, or from 2 μm to 10 μm).

The plurality of particles can, in some examples, be substantially monodisperse. "Monodisperse" and "homogeneous size distribution," as used herein, and generally describe a population of particles where all of the particles are the same or nearly the same size. As used herein, a monodisperse distribution refers to particle size distributions in which 70% of the distribution (e.g., 75% of the distribution, 80% of the distribution, 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of particles can comprise particles of any shape (e.g., sphere, rod, cube, rectangle, octahedron, truncated octahedron, plate, cone, prism, ellipse, triangle, etc.). In some examples, the plurality particles can have an isotropic shape. In some examples, the plurality of particles are substantially spherical in shape.

The cathode can, for example, have a surface area of 0.1 $m^2 g^{-1}$ or more (e.g., 0.2 $m^2 g^{-1}$ or more, 0.3 $m^2 g^{-1}$ or more, 0.4 $m^2 g^{-1}$ or more, 0.5 $m^2 g^{-1}$ or more, 0.75 $m^2 g^{-1}$ or more, 1 $m^2 g^{-1}$ or more, 1.25 $m^2 g^{-1}$ or more, 1.5 $m^2 g^{-1}$ or more, 2 $m^2 g^{-1}$ or more, 2.5 $m^2 g^{-1}$ or more, 3 $m^2 g^{-1}$ or more, 4 $m^2 g^{-1}$ or more, 5 $m^2 g^{-1}$ or more, 7.5 $m^2 g^{-1}$ or more, 10 $m^2 g^{-1}$ or more, 15 $m^2 g^{-1}$ or more, 20 $m^2 g^{-1}$ or more, 30 $m^2 g^{-1}$ or more, 40 $m^2 g^{-1}$ or more, 60 $m^2 g^1$ or more, or 80 $m^2 g^1$ or more). In some examples, the cathode can have a surface are of 100 $m^2 g^{-1}$ or less (e.g., 90 $m^2 g^{-1}$ or less, 80 $m^2 g^{-1}$ or less, 70 $m^2 g^{-1}$ or less, 60 $m^2 g^{-1}$ or less, 50 $m^2 g^{-1}$ or less, 40 $m^2 g^{-1}$ or less, 30 $m^2 g^{-1}$ or less, 20 $m^2 g^{-1}$ or less, 15 $m^2 g^{-1}$ or less, 10 $m^2 g^{-1}$ or less, 7.5 $m^2 g^{-1}$ or less, 5 $m^2 g^{-1}$ or less, 4 $m^2 g^{-1}$ or less, 3 $m^2 g^{-1}$ or less, 2.5 $m^2 g^{-1}$ or less, 2 $m^2 g^{-1}$ or less, 1.5 $m^2 g^{-1}$ or less, 1.25 $m^2 g^{-1}$ or less, 1 $m^2 g^{-1}$ or less, 0.75 $m^2 g^{-1}$ or less, 0.5 $m^2 g^{-1}$ or less, 0.4 $m^2 g^{-1}$ or less, 0.3 $m^2 g^{-1}$ or less, or 0.2 $m^2 g^{-1}$ or less). The surface area of the cathode can range from any of the minimum values described above to any of the maximum values described above. For example, the cathode can have a surface area of from 0.1 $m^2 g^{-1}$ to 100 $m^2 g^{-1}$ (e.g., from 0.1 $m^2 g^{-1}$ to 50 $m^2 g^{-1}$, from 50 $m^2 g^{-1}$ to 100 $m^2 g^{-1}$, from 0.1 $m^2 g^1$ to 20 $m^2 g^{-1}$, from 20 $m^2 g^{-1}$ to 40 $m^2 g^{-1}$, from 40 $m^2 g^{-1}$ to 60 $m^2 g^{-1}$, from 60 $m^2 g^{-1}$ to 80 $m^2 g^{-1}$, from 80 $m^2 g^{-1}$ to 100 $m^2 g^{-1}$, from 0.1 $m^2 g^{-1}$ to 10 $m^2 g^{-1}$, from 5 $m^2 g^{-1}$ to 100 $m^2 g^{-1}$, from 0.1 $m^2 g^{-1}$ to 0.5 $m^2 g^{-1}$, from 0.1 $m^2 g^{-1}$ to 1 $m^2 g^{-1}$, from 0.5 $m^2 g^{-1}$ to 2.5 $m^2 g^{-1}$, from 2.5 $m^2 g^{-1}$ to 10 $m^2 g^{-1}$, from 10 $m^2 g^{-1}$ to 30 $m^2 g^{-1}$, from 30 $m^2 g^{-1}$ to 100 $m^2 g^{-1}$, or from 5 $m^2 g^{-1}$ to 30 $m^2 g^{-1}$). The surface area of the cathode can be determined by common methods known in the art, for example using Brunauer-Emmett-Teller (BET) measurements.

In some examples, the cathode can have an active mass loading of 1 $mg\ cm^{-2}$ or more (e.g., 1.25 $mg\ cm^{-2}$ or more, 1.5 $mg\ cm^{-2}$ or more, 1.75 $mg\ cm^{-2}$ or more, 2 $mg\ cm^{-2}$ or more, 2.5 $mg\ cm^{-2}$ or more, 3 $mg\ cm^{-2}$ or more, 3.5 $mg\ cm^{-2}$ or more, 4 $mg\ cm^{-2}$ or more, 4.5 $mg\ cm^{-2}$ or more, 5 $mg\ cm^{-2}$ or more, 6 $mg\ cm^{-2}$ or more, 7 $mg\ cm^{-2}$ or more, 8 $mg\ cm^{-2}$ or more, 9 $mg\ cm^{-2}$ or more, 10 $mg\ cm^{-2}$ or more, 11 $mg\ cm^{-2}$ or more, 12 $mg\ cm^{-2}$ or more, 13 $mg\ cm^{-2}$ or more, 14 $mg\ cm^{-2}$ or more, 15 $mg\ cm^{-2}$ or more, 20 mg cm$^{-2}$ or more, 25 mg cm$^{-2}$ or more, 30 mg cm$^{-2}$ or more, 35 mg cm$^{-2}$ or more, or 40 mg cm$^{-2}$ or more). In some examples, the cathode can have an active mass loading of 50 mg cm$^{-2}$ or less (e.g., 45 mg cm$^{-2}$ or less, 40 mg cm$^{-2}$ or less, 35 mg cm$^{-2}$ or less, 30 mg cm$^{-2}$ or less, 25 mg cm$^{-2}$ or less, 20 mg cm$^{-2}$ or less, 15 mg cm$^{-2}$ or less, 14 mg cm$^{-2}$ or less, 13 mg cm$^{-2}$ or less, 12 mg cm$^{-2}$ or less, 11 mg cm$^{-2}$ or less, 10 mg cm$^{-2}$ or less, 9 mg cm$^{-2}$ or less, 8 mg cm$^{-2}$ or less, 7 mg cm$^{-2}$ or less, 6 mg cm$^{-2}$ or less, 5 mg cm$^{-2}$ or less, 4.5 mg cm$^{-2}$ or less, 4 mg cm$^{-2}$ or less, 3.5 mg cm$^{-2}$ or less, 3 mg cm$^{-2}$ or less, 2.5 mg cm$^{-2}$ or less, 2 mg cm$^{-2}$ or less, 1.75 mg cm$^{-2}$ or less, 1.5 mg cm$^{-2}$ or less, or 1.25 mg cm$^{-2}$ or less). The active mass loading of the cathode can range from any of the minimum values described above to any of the maximum values described above. For example, the cathode can have an active mass loading of from 1 mg cm$^{-2}$ or less to 50 mg cm$^{-2}$ or less (e.g., from 1 mg cm$^{-2}$ to 25 mg cm$^{-2}$, from 25 mg cm$^{-2}$ to 50 mg cm$^{-2}$, from 1 mg cm$^{-2}$ to 10 mg cm$^{-2}$, from 10 mg cm$^{-2}$ to 50 mg cm$^{-2}$, from 1 mg cm$^{-2}$ to 5 mg cm$^{-2}$, from 5 mg cm$^{-2}$ to 20 mg cm$^{-2}$, from 20 mg cm$^{-2}$ to 50 mg cm$^{-2}$, from 4 mg cm$^{-2}$ to 30 mg cm$^{-2}$, from 30 mg cm$^{-2}$ to 50 mg cm$^{-2}$, or from 4 mg cm$^{-2}$ to 5 mg cm 2).

In some examples, the specific charge-storage capacity of the cathode can be 100 mA h g$^{-1}$ or more (e.g., 110 mA h g$^{-1}$ or more, 120 mA h g$^{-1}$ or more, 130 mA h g$^{-1}$ or more, 140 mA h g$^{-1}$ or more, 150 mA h g$^{-1}$ or more, 160 mA h g$^{-1}$ or more, 170 mA h g$^{-1}$ or more, 180 mA h g$^{-1}$ or more, 190 mA h g$^{-1}$ or more, 200 mA h g$^{-1}$ or more, 210 mA h g$^{-1}$ or more, 220 mA h g$^{-1}$ or more, 230 mA h g$^{-1}$ or more, 240 mA h g$^{-1}$ or more, 250 mA h g$^{-1}$ or more, 260 mA h g$^{-1}$ or more, 270 mA h g$^{-1}$ or more, 280 mA h g$^{-1}$ or more, 290 mA h g$^{-1}$ or more, 300 mA h g$^{-1}$ or more, 310 mA h g$^{-1}$ or more, 320 mA h g$^{-1}$ or more, 330 mA h g$^{-1}$ or more, or 340 mA h g$^{-1}$ or more) within an applied voltage window between 2.0 V to 5.5 V vs. Li/Li$^+$. In some example, the specific charge-storage capacity of the cathode can be 350 mA h g$^{-1}$ or less (e.g., 340 mA h g$^{-1}$ or less, 330 mA h g$^{-1}$ or less, 320 mA h g$^{-1}$ or less, 310 mA h g$^{-1}$ or less, 300 mA h g$^{-1}$ or less, 290 mA h g$^{-1}$ or less, 280 mA h g$^{-1}$ or less, 270 mA h g$^{-1}$ or less, 360 mA h g$^{-1}$ or less, 250 mA h g$^{-1}$ or less, 240 mA h g$^{-1}$ or less, 230 mA h g$^{-1}$ or less, 220 mA h g$^{-1}$ or less, 210 mA h g$^{-1}$ or less, 200 mA h g$^{-1}$ or less, 190 mA h g$^{-1}$ or less, 180 mA h g$^{-1}$ or less, 170 mA h g$^{-1}$ or less, 160 mA h g$^{-1}$ or less, 150 mA h g$^{-1}$ or less, 140 mA h g$^{-1}$ or less, 130 mA h g$^{-1}$ or less, 120 mA h g$^{-1}$ or less, or 110 mA h g$^{-1}$ or less) within an applied voltage window between 2.0 V to 5.5 V vs. Li/Li$^+$.

The specific charge-storage capacity of the cathode within an applied voltage window between 2.0 V to 5.5 V vs. Li/Li$^+$ can range from any of the minimum values described above to any of the maximum values described above. For example, the specific charge-storage capacity of the cathode can be from 100 mA h g$^{-1}$ to 350 mA h g$^{-1}$ within an applied voltage window between 2.0 V to 5.5 V vs. Li/Li$^+$ (e.g., from 100 mA h g$^{-1}$ to 200 mA h g$^{-1}$, from 200 mA h g$^{-1}$ to 350 mA h g$^1$, from 100 mA h g$^{-1}$ to 150 mA h g$^{-1}$, from 150 mA h g$^{-1}$ to 200 mA h g$^{-1}$, from 200 mA h g$^{-1}$ to 250 mA h g$^{-1}$, from 250 mA h g$^{-1}$ to 300 mA h g$^{-1}$, from 300 mA h g$^{-1}$ to 350 mA h g$^{-1}$, from 150 mA h g$^{-1}$ to 250 mA h g$^{-1}$, or from 180 mA h g$^{-1}$ to 260 mA h g$^{-1}$).

The cathode can, in some examples, have a specific capacity of 200 mA h g$^{-1}$ or more at a current density of 180 mA g$^{-1}$ over 100 charge/discharge cycles (e.g., 205 mA h g$^{-1}$ or more, 210 mA h g$^{-1}$ or more, 215 mA h g$^{-1}$ or more, 220 mA h g$^{-1}$ or more, 225 mA h g$^{-1}$ or more, 230 mA h g$^{-1}$ or more, 235 mA h g$^{-1}$ or more, 240 mA h g$^{-1}$ or more, or 245 mA h g$^{-1}$ or more). In some examples, the cathode can have a specific capacity of 250 mA h g$^{-1}$ or less at a current density of 180 mA g$^{-1}$ over 100 charge/discharge cycles (e.g., 245 mA h g$^{-1}$ or less, 240 mA h g$^{-1}$ or less, 235 mA h g$^{-1}$ or less, 230 mA h g$^{-1}$ or less, 225 mA h g$^{-1}$ or less, 220 mA h g$^{-1}$ or less, 215 mA h g$^{-1}$ or less, 210 mA h g$^{-1}$ or less, or 205 mA h g$^{-1}$ or less). The specific capacity of the cathode at a current density of 180 mA g$^{-1}$ over 100 charge/discharge cycles can range from any of the minimum values described above to any of the maximum values described above. For example, the cathode can have a specific capacity of from 200 mA h g$^{-1}$ to 250 mA h g$^{-1}$ at a current density of 180 mA g$^{-1}$ over 100 charge/discharge cycles (e.g., from 200 mA h g$^{-1}$ mA h g$^{-1}$ to 225 mA h g$^{-1}$, from 225 mA h g$^{-1}$ to 250 mA h g$^{-1}$, from 200 mA h g$^{-1}$ to 210 mA h g$^{-1}$, from 210 mA h g$^{-1}$ to 220 mA h g$^{-1}$, from 220 mA h g$^{-1}$ to 230 mA h g$^{-1}$, from 230 mA h g$^{-1}$ to 240 mA h g$^{-1}$, from 240 mA h g$^{-1}$ to 250 mA h g$^{-1}$, or from 230 mA h g$^{-1}$ to 250 mA h g$^{-1}$).

The specific capacity of a cathode with an active mass loading of from 1 mg cm$^{-2}$ to 50 mg cm$^{-2}$ can, in some examples, be 150 mA h g$^{-1}$ or more at a current density of 60 mA g$^{-1}$ at ambient temperature (e.g., 155 mA h g$^{-1}$ or more, 160 mA h g$^{-1}$ or more, 165 mA h g$^{-1}$ or more, 170 mA h g$^{-1}$ or more, 175 mA h g$^{-1}$ or more, 180 mA h g$^{-1}$ or more, 185 mA h g$^{-1}$ or more, 190 mA h g$^{-1}$ or more, 195 mA h g$^{-1}$ or more, 200 mA h g$^{-1}$ or more, 205 mA h g$^{-1}$ or more, 210 mA h g$^{-1}$ or more, 215 mA h g$^{-1}$ or more, 220 mA h g$^{-1}$ or more, 225 mA h g$^{-1}$ or more, 230 mA h g$^{-1}$ or more, 235 mA h g$^{-1}$ or more, or 240 mA h g$^{-1}$ or more). In some examples, the specific capacity of a cathode with an active mass loading of from 1 mg cm$^{-2}$ to 50 mg cm$^{-2}$ can be 250 mA h g$^{-1}$ or less at a current density of 60 mA g$^{-1}$ at ambient temperature (e.g., 245 mA h g$^{-1}$ or less, 240 mA h g$^{-1}$ or less, 235 mA h g$^{-1}$ or less, 230 mA h g$^{-1}$ or less, 225 mA h g$^{-1}$ or less, 220 mA h g$^{-1}$ or less, 215 mA h g$^{-1}$ or less, 210 mA h g$^{-1}$ or less, 205 mA h g$^{-1}$ or less, 200 mA h g$^{-1}$ or less, 195 mA h g$^{-1}$ or less, 190 mA h g$^{-1}$ or less, 185 mA h g$^{-1}$ or less, 180 mA h g$^{-1}$ or less, 175 mA h g$^{-1}$ or less, 170 mA h g$^{-1}$ or less, 165 mA h g$^{-1}$ or less, 160 mA h g$^{-1}$ or less, or 155 mA h g$^{-1}$ or less). The specific capacity of the cathode with an active mass loading of from 1 mg cm$^{-2}$ to 50 mg cm$^{-2}$ at a current density of 60 mA g$^{-1}$ at ambient temperature can range from any of the minimum values described above to any of the maximum values described above. For example, the specific capacity of a cathode with an active mass loading of from 1 mg cm$^{-2}$ to 50 mg cm$^{-2}$ at a current density of 60 mA g$^{-1}$ at ambient temperature can be from 150 mA h g$^{-1}$ to 250 mA h g$^{-1}$ (e.g., from 150 mA h g$^{-1}$ to 200 mA h g$^{-1}$, from 200 mA h g$^{-1}$ to 250 mA h g$^{-1}$, from 150 mA h g$^{-1}$ to 170 mA h g$^{-1}$, from 170 mA h g$^{-1}$ to 190 mA h g$^{-1}$, from 190 mA h g$^{-1}$ to 210 mA h g$^{-1}$, from 210 mA h g$^{-1}$ to 230 mA h g$^1$, from 230 mA h g$^1$, to 250 mA h g$^{-1}$, from 230 mA h g$^{-1}$ to 240 mA h g$^{-1}$, from 200 mA h g$^{-1}$ to 240 mA h g$^{-1}$, or from 210 mA h g$^{-1}$ to 240 mA h g$^1$).

In some examples, the discharge capacity of a cathode with an active mass loading of from 1 mg cm$^{-2}$ to 50 mg cm$^{-2}$ can be 150 mA h g$^{-1}$ or more at a current density of 1800 mA g$^{-1}$ at ambient temperature (e.g., 160 mA h g$^{-1}$ or more, 170 mA h g$^{-1}$ or more, 180 mA h g$^{-1}$ or more, 190 mA h g$^{-1}$ or more, 200 mA h g$^{-1}$ or more, 210 mA h g$^{-1}$ or more, 220 mA h g$^{-1}$ or more, 230 mA h g$^{-1}$ or more, or 240 mA h g$^{-1}$ or more). In some examples, the discharge capacity of a cathode with an active mass loading of from 1 mg cm$^{-2}$ to 50 mg cm$^{-2}$ can be 250 mA h g$^{-1}$ or less at a current density of 1800 mA g$^{-1}$ at ambient temperature (e.g., 240 mA h g$^{-1}$ or less, 230 mA h g$^{-1}$ or less, 220 mA h g$^{-1}$ or less, 210 mA h g$^{-1}$ or less, 200 mA h g$^{-1}$ or less, 190 mA h g$^{-1}$ or less, 180 mA h g$^{-1}$ or less, 170 mA h g$^{-1}$ or less, or 160 mA h g$^{-1}$ or less). The discharge capacity of a cathode with an active mass loading of from 1 mg cm$^{-2}$ to 50 mg cm$^{-2}$ more at a current density of 1800 mA g$^{-1}$ at ambient temperature can range from any of the minimum values described above to any of the maximum values described above. For example, the discharge capacity of a cathode with an active mass loading of from 1 mg cm$^{-2}$ to 50 mg cm$^{-2}$ can be from 150 mA h g$^{-1}$ to 250 mA h g$^{-1}$ at a current density of 1800 mA g$^{-1}$ at ambient temperature (e.g., from 150 mA h g$^{-1}$ to 200 mA h g$^{-1}$, from 200 mA h g$^{-1}$ to 250 mA h g$^{-1}$, from 150 mA h g$^{-1}$ to 180 mA h g$^{-1}$, from 180 mA h g$^{-1}$ to 210 mA h g$^{-1}$, from 210 mA h g$^{-1}$ to 230 mA h g$^{-1}$, from 230 mA h g$^{-1}$ to 250 mA h g$^{-1}$, or from 200 mA h g$^{-1}$ to 240 mA h g$^{-1}$). As used herein, ambient temperature is meant to include temperatures of from 20° C. to 30° C.

In some examples, the discharge capacity of cathode with an active mass loading of from 1 mg cm$^{-2}$ to 50 mg cm$^{-2}$ can be 50 mA h g$^{-1}$ or more at a charge density of 14400 mA g$^{-1}$ at ambient temperature (e.g., 60 mA h g$^{-1}$ or more, 70 mA h g$^{-1}$ or more, 80 mA h g$^{-1}$ or more, 90 mA h g$^{-1}$ or more, 100 mA h g$^{-1}$ or more, 110 mA h g$^{-1}$ or more, 120 mA h g$^{-1}$ or more, 130 mA h g$^{-1}$ or more, or 140 mA h g$^{-1}$ or more). In some examples, the discharge capacity of device cathode with an active mass loading of from 1 mg cm$^{-2}$ to 50 mg cm$^{-2}$ can be 150 mA h g$^{-1}$ or less at a charge density of 14400 mA g$^{-1}$ at ambient temperature (e.g., 140 mA h g$^{-1}$ or less, 130 mA h g$^{-1}$ or less, 120 mA h g$^{-1}$ or less, 110 mA h g$^{-1}$ or less, 100 mA h g$^{-1}$ or less, 90 mA h g$^{-1}$ or less, 80 mA h g$^{-1}$ or less, 70 mA h g$^{-1}$ or less, or 60 mA h g$^{-1}$ or less). The discharge capacity of device cathode with an active mass loading of from 1 mg cm$^{-2}$ to 50 mg cm$^{-2}$ at a charge density of 14400 mA g$^{-1}$ at ambient temperature can range from any of the minimum values described above to any of the maximum values described above. For example, the discharge capacity of device cathode with an active mass loading of from 1 mg cm$^{-2}$ to 50 mg cm$^{-2}$ can be from 50 mA h g$^{-1}$ to 150 mA h g$^{-1}$ at a charge density of 14400 mA g$^{-1}$ at ambient temperature (e.g., from 50 mA h g$^{-1}$ to 100 mA h g$^{-1}$, from 100 mA h g$^{-1}$ to 150 mA h g, from 50 mA h g$^{-1}$ to 70 mA h g$^1$, from 70 mA h g$^{-1}$ to 90 mA h g$^1$, from 90 mA h g$^{-1}$ to 110 mA h g$^{-1}$, from 110 mA h g$^{-1}$ to 130 mA h g$^1$, from 130 mA h g$^{-1}$ to 150 mA h g$^{-1}$, or from 70 mA h g$^{-1}$ to 150 mA h g$^{-1}$).

The anode can comprise any suitable material, such as, for example, graphite, silicon, lithium titanate ($Li_4Ti_5O_{12}$), tin, antimony, zinc, phosphorous, lithium, or a combination thereof. In some examples, the anode comprises graphite. In some examples, the anode comprises a mesocarbon microbead graphite anode.

The electrochemical device can have a first capacity at a charge density of 180 mA g$^{-1}$ and a second capacity at a charge density of 18 mA g$^{-1}$. In some examples, the first capacity is 90% or more of the second capacity (e.g., 91% or more, 92% or more, 93% or more, 94% or more, 95% or more, 96% or more, 97% or more, 98% or more, or 99% or more). In some examples, the first capacity if 99% or more of the second capacity (e.g., 99.1% or more, 99.2% or more, 99.3% or more, 99.4% or more, 99.5% or more, 99.6% or more, 99.7% or more, 99.8% or more, or 99.9% or more).

In some examples, the electrochemical device has a capacity retention of 80% or more after 500 charge/discharge cycles at ambient temperature (e.g., 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, or 99% or more).

In some examples, a charging rate of 1.25 mA cm$^{-2}$ or more (e.g., 1.5 mA cm$^{-2}$ or more, 1.75 mA cm$^{-2}$ or more, 2 mA cm$^{-2}$ or more, 2.25 mA cm$^{-2}$ or more, 2.5 mA cm$^{-2}$ or more, 2.75 mA cm$^{-2}$ or more, 3 mA cm$^{-2}$ or more, 3.25 mA cm$^{-2}$ or more, 3.5 mA cm$^{-2}$ or more, 3.75 mA cm$^{-2}$ or more, 4 mA cm$^{-2}$ or more, 4.25 mA cm$^{-2}$ or more, 4.5 mA cm$^{-2}$ or more, 4.75 mA cm$^{-2}$ or more, 5 mA cm$^{-2}$ or more, 5.25 mA cm$^{-2}$ or more, 5.5 mA cm$^{-2}$ or more, 5.75 mA cm$^{-2}$ or more, 6 mA cm$^{-2}$ or more, 6.25 mA cm$^{-2}$ or more, 6.5 mA cm$^{-2}$ or more, 6.75 mA cm$^{-2}$ or more, or 7 mA cm$^{-2}$ or more) can be applied to the electrochemical devices described herein at 0° C. with a Coulombic efficiency of 99.8% or more.

The electrochemical devices described herein can, for example, have a charging rate of 1.2C or more at room temperature (e.g., 1.3C or more, 1.4C or more, 1.5C or more, 1.6C or more, 1.7C or more, 1.8C or more, 1.9C or more, 2C or more, 2.5C or more, 3C or more, 3.5C or more, 4C or more, or 4.5C or more). In some examples, the electrochemical device can have a charging rate of 5C or less at room temperature (e.g., 4.5C or less, 4C or less, 3.5C or less, 3C or less, 2.5C or less, 2C or less, 1.9C or less, 1.8 C or less, 1.7 C or less, 1.6 C or less, 1.5 C or less, 1.4 C or less, or 1.3 C or less). The charging rate at room temperature of the electrochemical device can range from any of the minimum values described above to any of the maximum values described above. For example, the electrochemical device can have a charging rate of from 1.2C to 5C at room temperature (e.g., from 1.2C to 2.5C, from 2.5C to 5C, from 1.2C to 2C, from 2C to 3C, from 3C to 4C, from 4C to 5C, or from 1.2C to 3C). As used herein, room temperature is meant to include temperatures of 20-30° C.

In some examples, the electrochemical devices exhibit reduced irreversible capacity loss during initial charge-discharge cycles for passivation of the anode. For example, the electrochemical devices can have an irreversible charge capacity loss of 13% or less (e.g., 12% or less, 11% or less, 10% or less, 9% or less, 8% or less, 7% or less, 6% or less, 5% or less, 4% or less, 3% or less, 2% or less, or 1% or less).

The electrochemical devices can exhibit improved performance metrics. In some examples, the electrochemical device comprises a battery with improved energy density, improved cyclability, and improved power capability, as well as better safety under abuse conditions (e.g., overcharge, excess heat). In some examples, the battery can exhibit charge-storage capacity improvement (e.g., energy density improvement), charge-discharge rate performance improvement at both room temperature and at subzero temperatures (e.g., power density improvement), cycle life improvement, and safety improvement over conventional lithium-ion batteries used in the art comprising electrolytes other than those described herein and/or using cathodes other than those described herein. In some examples, the cathode of the electrochemical device can be selected in view of the desired properties of the electrochemical device, such as improved energy density. For example, the improved energy density of the electrochemical device can originate from the high charge-storage capacity (e.g., 200-250 mA h g$^{-1}$) of the Ni-rich layered oxide cathode (e.g., $LiNi_{0.94}Co_{0.06}O_2$). In some examples, the electrolyte can be selected in view of the desired properties of the electrochemical device, such as improved cyclability. For example, the lithium imide salt, lithium borate salt, and/or aprotic acyclic solvent can be selected to produce robust surface passivating films at the cathode and/or anode at high operating voltages. In some examples, the improved cyclability of the electrochemical devices can originate from robust surface passivating films formed on both the cathode and anode during operation of the electrochemical device, wherein the surface passivating films can reduce or prevent electrolyte penetration and unwanted side reactions. In some examples, the battery is stable at high operating voltages (e.g., at an operating voltage of 4.3 V or more vs. Li/Li$^+$). In some examples, the improved safety of the battery can originate from the inhibited or eliminated total heat generated from exothermic reactions between the delithiated Ni-rich cathode and the electrolyte upon heating. In some examples, the improved safety can originate from a lower extent of metallic lithium plating at the anode surface upon fast charging of the battery. In some examples, the improved high-rate performance of the battery can originate from the high Li-ion conductivity of the lithium imide salt. In some examples, the improved high-rate performance of the battery can originate from the rapid Li-ion transport and solvation/de-solvation in the low-viscosity, weak-binding, aprotic acyclic carbonate solvent. In some examples, the improved high-rate performance of the battery can originate from the highly Li-ion conductive surface passivating films formed on the cathode and anode.

Methods of Use

Also provided herein are methods of use of the electrochemical devices described herein. For example, the electrochemical devices can be used as a battery in an electric vehicle.

In some examples, the electrochemical devices described herein can be used in various articles of manufacture including electronic devices, energy storage devices, energy conversion devices, optical devices, optoelectronic devices, or combinations thereof. Examples of articles of manufacture (e.g., devices) using the electrochemical devices described herein can include, but are not limited to, touch panels, electronic displays, transistors, grid energy storage systems, robotics, drones, space probes, satellites, and combinations thereof. Such articles of manufacture can be fabricated by methods known in the art.

EXAMPLES

The following examples are set forth to illustrate the methods and results according to the disclosed subject matter. These examples are not intended to be inclusive of all aspects of the subject matter disclosed herein, but rather to illustrate representative methods and results. These examples are not intended to exclude equivalents and variations which are apparent to one of ordinary skill in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

In order to address the main scientific issues facing the lithium-ion technology and realizing the practical deployment of next-generation high-energy-density nickel-rich layered oxide cathodes, described herein is a non-aqueous electrolyte system for improved electrode-electrolyte interfacial compatibility, thermal-abuse tolerance, and reaction kinetic properties.

Skeleton composition of the electrolyte comprises lithium bis(fluorosulfonyl)imide (LiFSI) as the main salt and ethyl methyl carbonate (EMC) as the solvent in Examples 1-4. Skeleton composition of the electrolyte comprises lithium bis(fluorosulfonyl)imide (LiFSI) and lithium difluoro(oxalate)borate (LiDFOB) as the main salts and ethyl methyl carbonate (EMC) as the solvent in Example 5. Robustness of this electrolyte system is tested in pouch-type cells based on a high-capacity nickel-rich layered oxide cathode (LiNi$_{0.94}$Co$_{0.06}$O$_2$) and a commercial graphite anode at both ambient (20° C.-30° C.) and low temperatures (0° C. and −20° C.). Cells with the LiFSI/EMC-based electrolyte described in Examples 1-4 and the LiFSI-LiDFOB/EMC electrolyte in Example 5 exhibit enhanced cyclability, safety under abuse conditions, and high-rate performance.

Example 1: Improved Electrode-Electrolyte Compatibility of the LiFSI/EMC-Based Electrolyte The nickel-rich layered oxide cathode used for the experiments described herein was LiNi$_{0.94}$Co$_{0.06}$O$_2$, which has a very high nickel concentration. This composition is expected to offer much higher charge-storage capacity values than those currently used in the Li-ion market.

Figure 2:
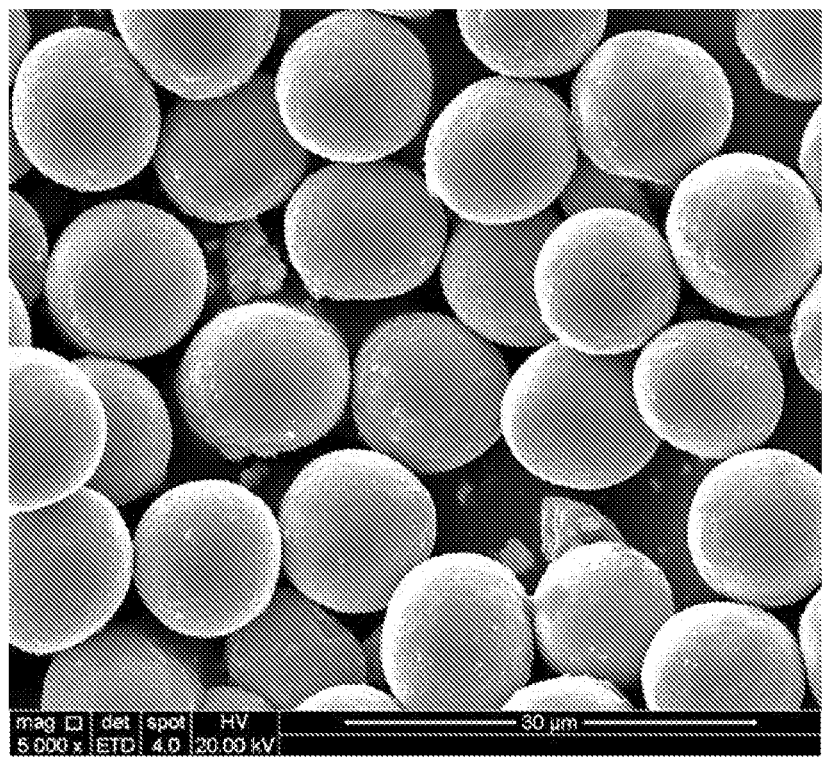
FIG. 2 is a scanning electron microscopy (SEM) image of as-prepared $LiNi_{0.94}Co_{0.06}O_2$, showing substantially uniform particle size and shape.
Figure 3:
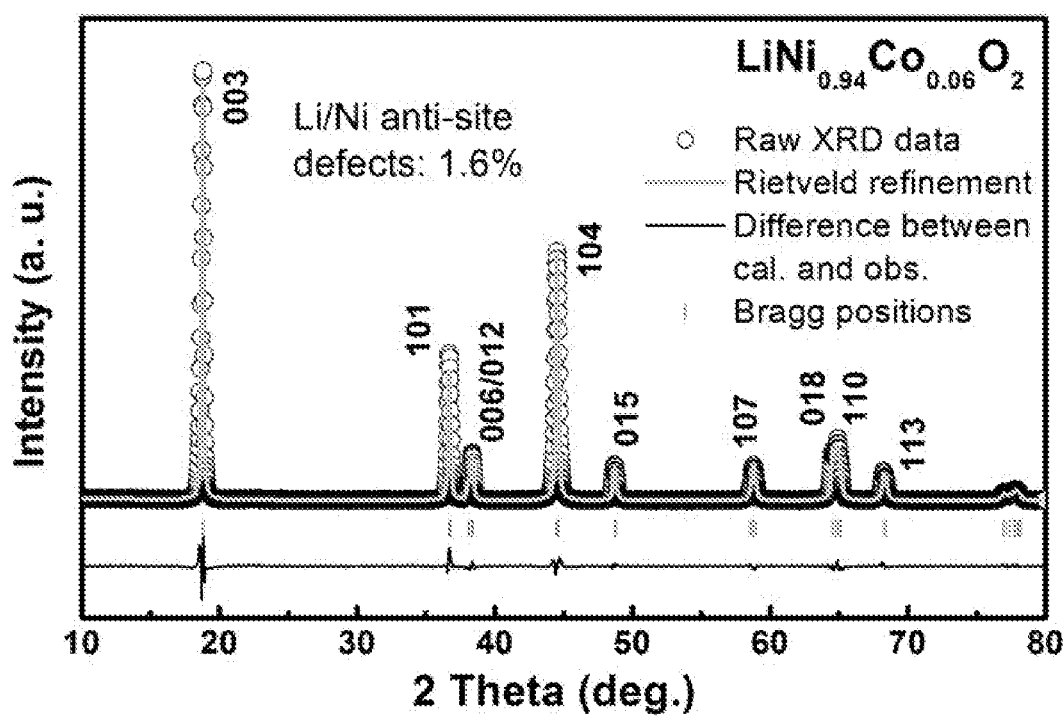
FIG. 3 shows the X-ray diffraction (XRD) pattern (circles) with Rietveld refinement, Bragg positions (vertical tick marks), and difference between the calculated pattern and observed data of $LiNi_{0.94}Co_{0.06}O_2$.

The ultrahigh-nickel cathode sample was prepared through a transition-metal co-precipitation process, as illustrated in FIG. 1. In FIG. 2, it can be seen that the LiNi$_{0.94}$Co$_{0.06}$O$_2$ sample comprises large, spherical particles with substantially uniform size distribution (~12-13 m). As mentioned above, since performance degradation of this class of cathode materials primarily stems from the particle surface, a relatively small surface area with such particle morphology (~0.5 m$^2$ g$^{-1}$) is desired. To minimize lithium deficiency and cation anti-site disorder (Ni$^{2+}$/Li), a common problem for LiNiO$_2$, a small amount of cobalt is doped into the sample. Powder X-ray diffraction (XRD) pattern of pristine LiNi$_{0.94}$Co$_{0.06}$O$_2$ shows a well-defined R$\bar{3}$m layered structure with the cation mixing of around 1.6%, as determined by Rietveld refinement (FIG. 3). Commercial materials often possess 2-3% cation mixing in spite of much lower nickel contents (≤0.7). The lower cation mixing in the LiNi$_{0.94}$Co$_{0.06}$O2 cathode material can contribute to an improved rate capability, which will be discussed in more detail in Example 2 below. The stoichiometry was determined as Li$_{0.97}$Ni$_{0.94}$Co$_{0.06}$O$_{1.96}$ by a redox titration method and inductively-coupled plasma-optical emission spectrometry.

Figure 4:
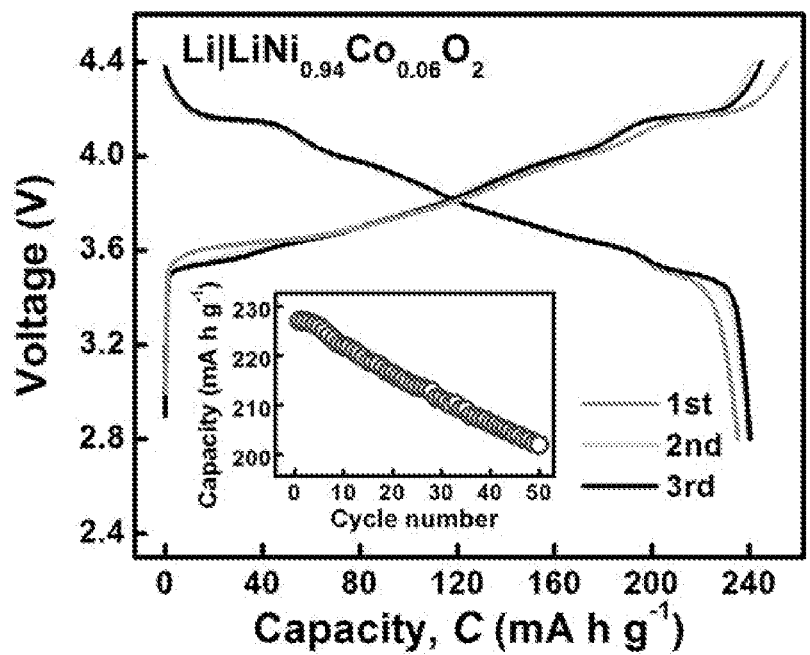
FIG. 4 shows the half-cell electrochemical characterization of $LiNi_{0.94}Co_{0.06}O_2$ via the voltage profiles during initial three charge-discharge cycles at C/5 under 40° C. in 2032 coin-type Li-metal half cells with baseline LiPF$_6$/ethylene carbonate (EC)-based electrolyte. The capacity evolution over 50 cycles under C/5 at 25° C. is shown as the inset. 1C is equal to 180 mA g$^{-1}$ herein.

The electrochemical performance of the ultrahigh-nickel cathode is recorded in lithium half cells at 40° C. FIG. 4 shows initial charge-discharge profiles of LiNi$_{0.94}$Co$_{0.06}$O$_2$ cycled between 2.8 and 4.4 V vs. Li/Li$^+$. It can be seen that LiNi$_{0.94}$Co$_{0.06}$O$_2$ achieves a high gravimetric discharge capacity of almost 240 mA h g$^{-1}$, nearly 25% higher than commercial products. However, LiNi$_{0.94}$Co$_{0.06}$O$_2$ showed rather poor cycling stability in baseline LiPF$_6$/EC-based electrolytes, with roughly 20% capacity drop after mere 50 charge-discharge cycles. The poor cyclability can be due to the electrochemical incompatibility between LiNiO$_2$ and the commercial LiPF$_6$/EC-based electrolytes at high voltages. With lower cut-off voltages (≤4.1 V vs. carbon), desired cell durability was achieved over several hundred cycles, though at the expense of the energy density (charge-storage capacities ≤190 mA h g$^{-1}$). Thus, improvement on electrode-electrolyte interfacial compatibility is needed to fully realize the capacity potential of ultrahigh-nickel $LiNi_{1-x}M_xO_2$ (such as $LiNi_{0.94}Co_{0.06}O_2$) cathode materials in practical applications.

To enhance the electrode-electrolyte compatibility, lithium bis(fluorosulfonyl)imide (LiFSI) was selected as the conducting salt for its high ionic conductivity (FIG. 5) and resistance against hydrolysis. The salt concentration was set at 1 mol $L^{-1}$ to avoid viscosity, impedance, cost, and/or separator wettability concerns that can be associated with highly concentrated solutions. To minimize parasitic reactions with both electrodes and Li-ion interactions with molecular solvents, ethyl methyl carbonate (EMC) was used as the sole solvent. Then, an amount of lithium difluoro(oxalate)borate (LiDFOB) (3% by weight) was employed to cater to the passivation of both the graphite anode and aluminum cathode current collector.

Figure 6:
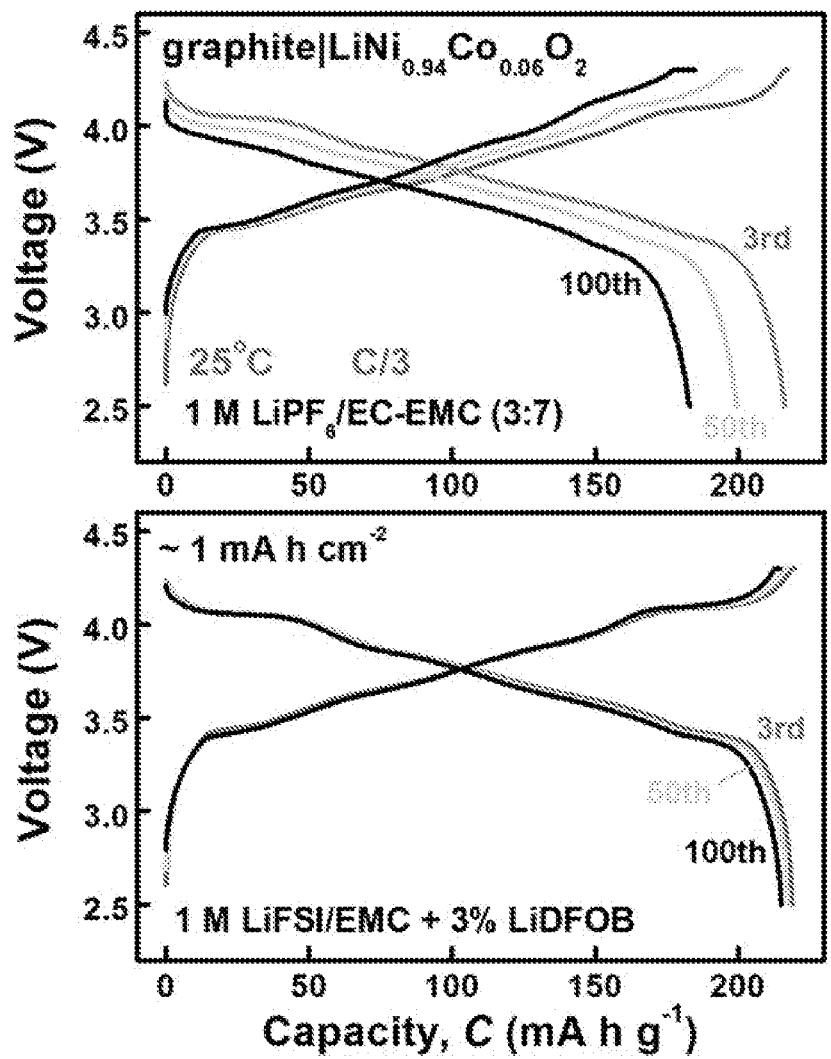
FIG. 6 shows the voltage profiles for $LiNi_{0.94}Co_{0.06}O_2$ in pouch-type graphite full cells during 100 cycles (after two formation cycles) in 1 M LiPF$_6$/EC-EMC (3:7 by wt.) and 1 M LiFSI/EMC+3 wt. % LiDFOB electrolyte solutions. The cells have an areal capacity loading of approximately 1 mA h cm$^{-2}$, anode/cathode ratio of ~1.1, and are cycled between 2.5 and 4.3 V at C/3 under 25° C. 1C is equal to 180 mA g$^{-1}$ herein.
Figure 7:
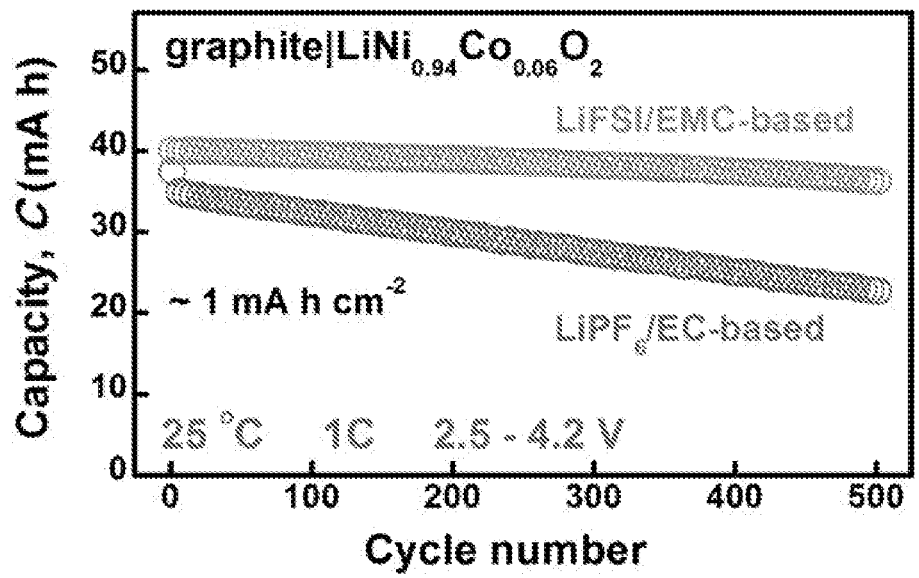
FIG. 7 shows the capacity evolution for $LiNi_{0.94}Co_{0.06}O_2$ in pouch-type graphite full cells during 500 cycles in 1 M LiPF$_6$/EC-EMC (3:7 by wt.)+2 wt. % vinylene carbonate (VC) and 1 M LiFSI/EMC+3 wt. % LiDFOB electrolyte solutions. The cells have an areal capacity loading of approximately 1 mA h cm$^{-2}$, anode/cathode ratio of ~1.1, and are cycled between 2.5 and 4.2 V at 1C under 25° C. 1C is equal to 180 mA g$^{-1}$ herein.
Figure 8:
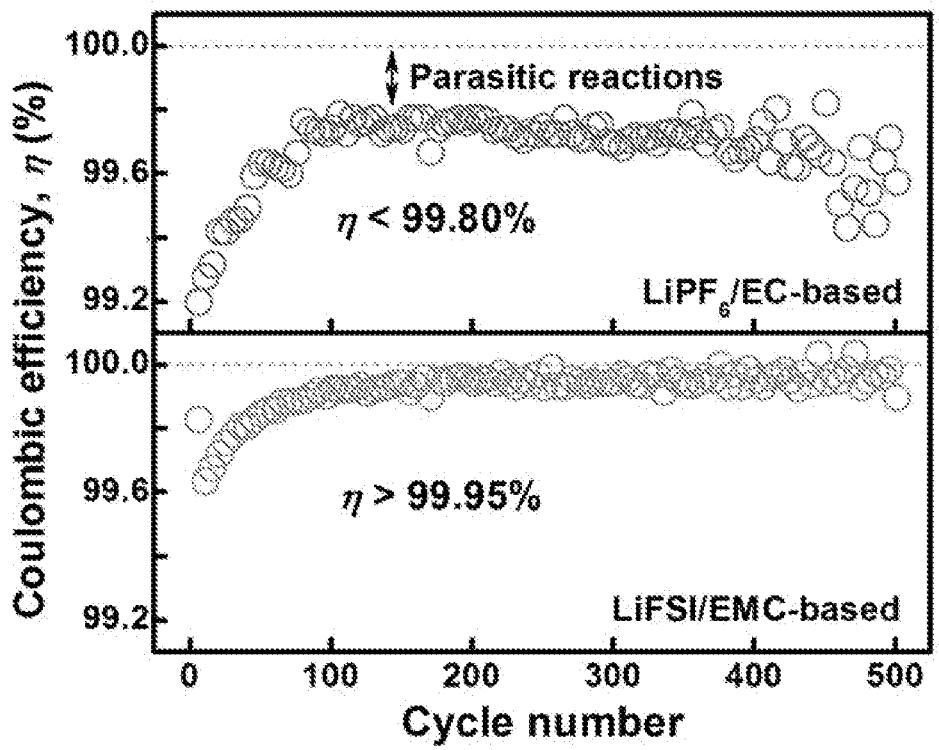
FIG. 8 shows variations of Coulombic efficiency for $LiNi_{0.94}Co_{0.06}O_2$ in pouch-type graphite full cells during 500 cycles in 1 M $LiPF_6$/EC-EMC (3:7 by wt.)+2 wt. % VC and 1 M LiFSI/EMC+3 wt. % LiDFOB electrolyte solutions. The cells have an areal capacity loading of approximately 1 mA h $cm^{-2}$, anode/cathode ratio of ~1.1, and are cycled between 2.5 and 4.2 V at 1C under 25° C. 1C is equal to 180 mA $g^{-1}$ herein.

Pouch-type full cells based on a $LiNi_{0.94}Co_{0.06}O_2$ cathode and mesocarbon microbead (MCMB) graphite anode were assembled to test the electrolyte developed herein. The skeleton composition of commercial electrolyte used herein included one molar $LiPF_6$ dissolved in a solvent mixture of EC and EMC (3:7 by weight). The assembled graphite|$LiNi_{0.94}Co_{0.06}O_2$ pouch full cells were evaluated in the baseline $LiPF_6$/EC-based and proposed LiFSI/EMC-based electrolytes over the course of 100 cycles (FIG. 6) and 500 cycles (FIG. 7 and FIG. 8). The removal of EC and $LiPF_6$ offers superior durability, i.e., ~90% capacity retention after 500 cycles (FIG. 7). In contrast, the baseline cell retains only ~70% of its original capacity. The large capacity fade can be ascribed to deterioration of the cathode-electrolyte interface with highly resistive surface deposits from sustained parasitic reactions, as evidenced by the low Coulombic efficiency ($\eta$<99.80%, FIG. 8). With the LiFSI/EMC-based electrolyte, these parasitic reactions are minimized ($\eta$>99.95%), indicative of the excellent electrochemical compatibility.

Figure 9:
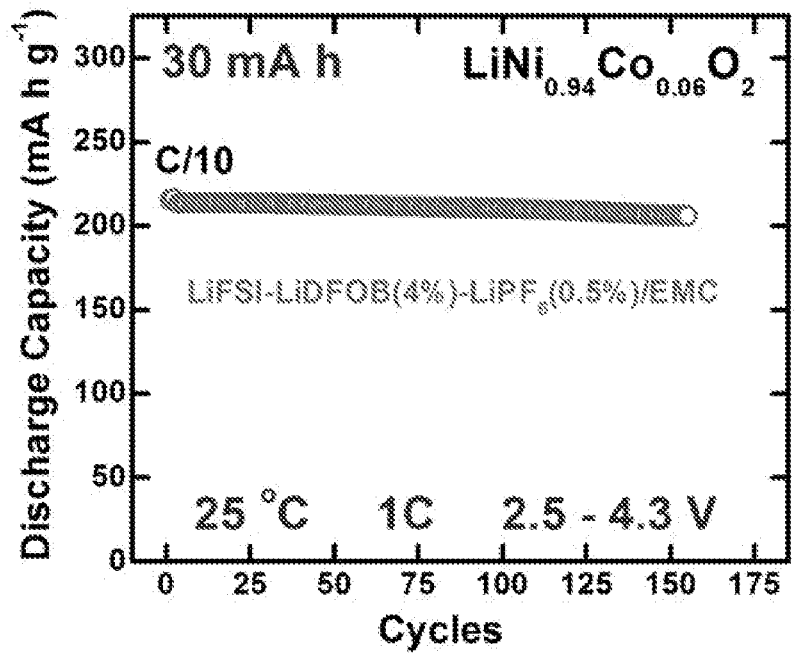
FIG. 9 shows the long-term cyclability of $LiNi_{0.94}Co_{0.06}O_2$-based pouch full cells in 1.0 M LiFSI/EMC+4 wt. % LiDFOB+0.5 wt. % $LiPF_6$. The cell underwent two formation cycles at C/10 and then cycled at 1C between 2.5 and 4.3 V under 25° C. Active material loading for the cathode is around 1 mA h $cm^2$.

Through incorporating an additional trace amount of $LiPF_6$ (0.5% by weight), the graphite|$LiNi_{0.94}Co_{0.06}O_2$ pouch full cell exhibited further stabilized cycling performance, as seen in FIG. 9. The trace amount of $LiPF_6$ as an additive can facilitate the generation of more dense and stable protective surface passivating films on both the cathode and anode. Since its addition is very small, the negative effects of $LiPF_6$ on cell stability mentioned above can be negligible.

The LiFSI/EMC-based electrolyte system is only the skeleton composition, which can be further strengthened with additional metal salts and/or aprotic solvents (as additives, co-solvents, diluents, etc.). For instance, long-term cycling stability, especially at elevated temperatures, can be further improved with more robust and stable surface passivating films formed on both the cathode and anode. The illustrated metal salt additive (i.e., LiDFOB, $LiPF_6$) may also be substituted with other metal salts containing Li and/or other metals for better performance metrics.

Example 2: Improved Power Capability Enabled by the LiFSI/EMC-Based Electrolyte In addition to the high capacity, $LiNi_{0.94}Co_{0.06}O_2$ also exhibits good high-rate performance. In the $Li[Ni_{1-x-y}Co_xMn_y]O_2$ system, rate capability substantially increases with nickel content because of increasing electronic conductivity and Li diffusivity by several orders of magnitude. This can be attributed to the Ni(II)/(III) mixed valence effects in charge compensation for Mn(IV). The state-of-the-art $LiPF_6$/EC-based electrolyte system enables decent cell reaction kinetics at ambient temperature (20-30° C.). However, commercial Li-ion cells suffer from severe energy and power loss at temperatures below 0° C. Besides the substantially enhanced electrode-electrolyte compatibility, the LiFSI/EMC-based electrolyte described herein can also exhibit excellent kinetic properties.

Figure 10:
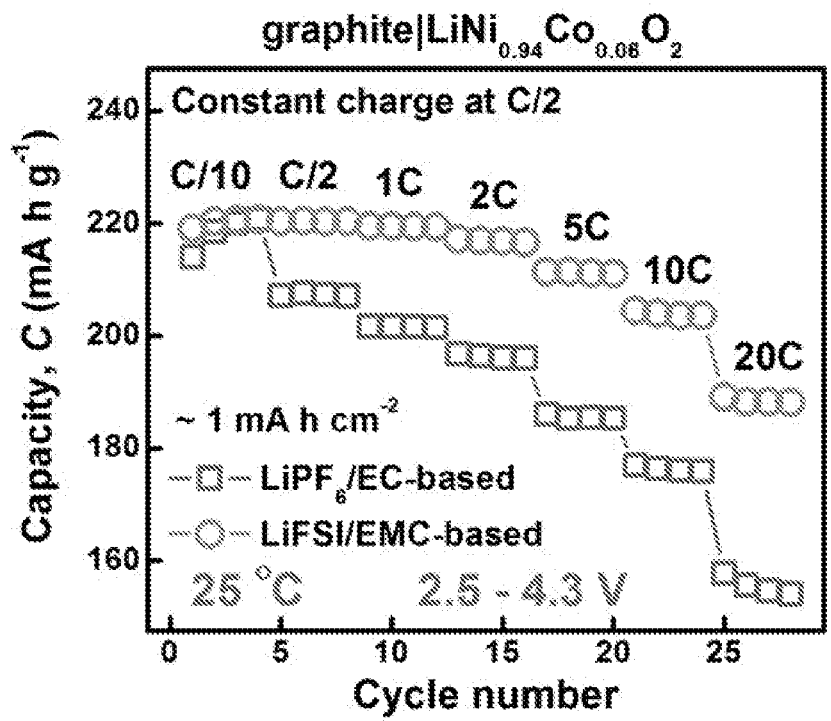
FIG. 10 shows the evolution of specific discharge capacity as a function of discharge current rates varying from C/10 to 20C of $LiNi_{0.94}Co_{0.06}O_2$ in pouch-type graphite full cells with 1 M $LiPF_6$/EC-EMC (3:7 by wt.)+2 wt. % VC and 1 M LiFSI/EMC+3 wt. % LiDFOB electrolytes. The cells have an areal capacity loading of ~1 mA h $cm^{-2}$, anode/cathode ratio of ~1.1, and are charged at a constant rate of C/2 and held at 4.3 V until the current drops to C/10. 1C is equal to 180 mA $g^{-1}$ herein.
Figure 11:
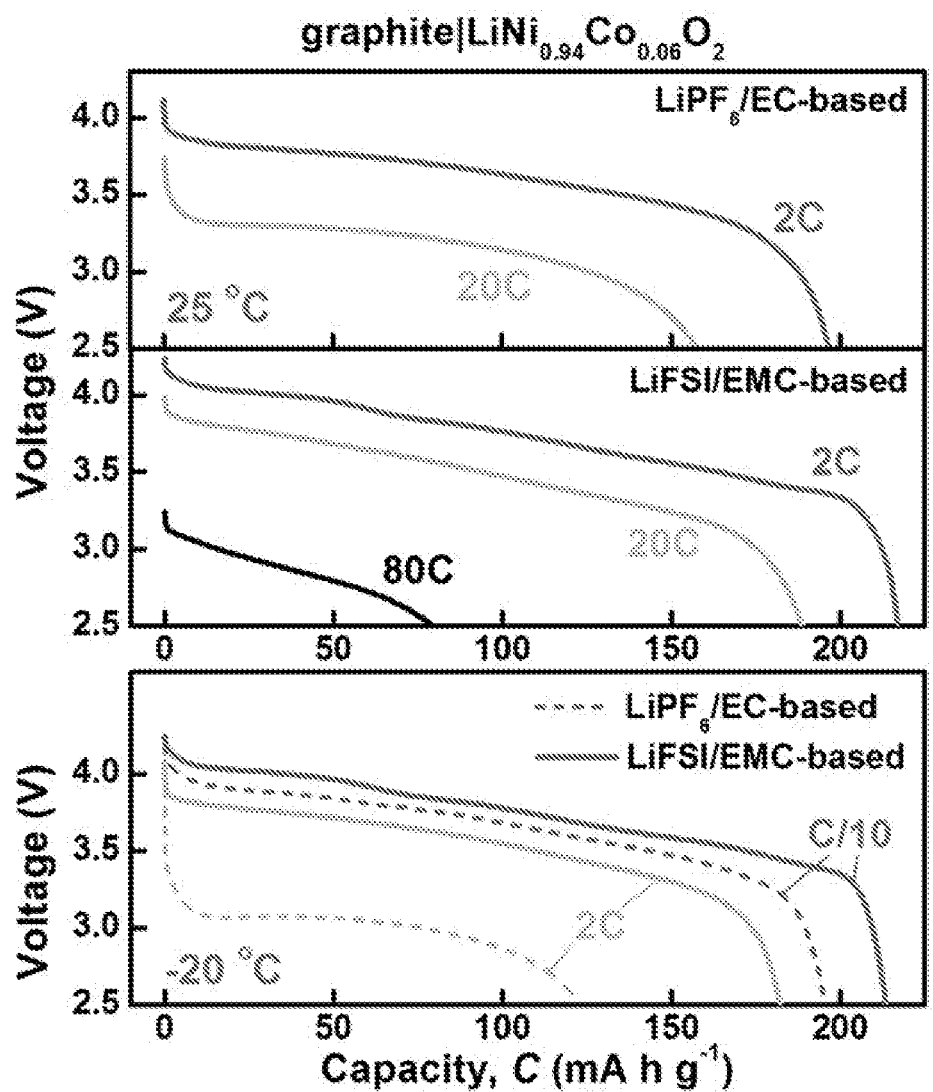
FIG. 11 shows the discharge profiles at 2C, 20C and 80C under 25° C. as well as at C/10 and 2C under −20° C. for $LiNi_{0.94}Co_{0.06}O_2$ in pouch-type graphite full cells with 1 M $LiPF_6$/EC-EMC (3:7 by wt.)+2 wt. % VC and 1 M LiFSI/EMC+3 wt. % LiDFOB electrolytes. The cells have an areal capacity loading of ~1 mA h $cm^{-2}$, anode/cathode ratio of ~1.1, and are charged at a constant rate of C/2 and held at 4.3 V until the current drops to C/10 under 25° C. For low-temperature testing, the cells were cooled at −20° C. for 6 h prior to the discharge tests. 1C is equal to 180 mA $g^{-1}$ herein.
Figure 12:
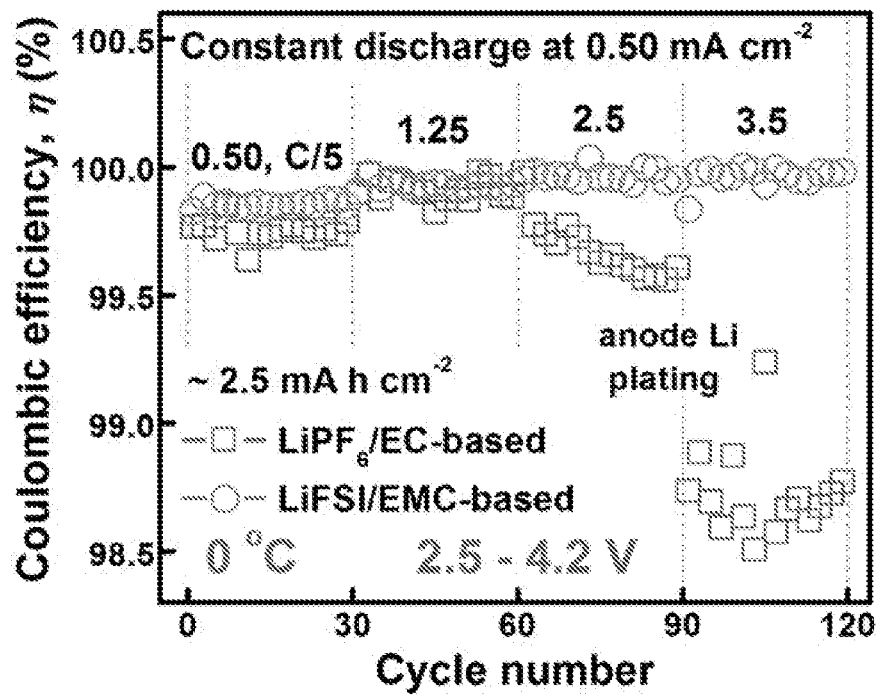
FIG. 12 shows variations of Coulombic efficiency at varying current densities at 0° C. of $LiNi_{0.94}Co_{0.06}O_2$ in pouch-type graphite full cells with 1 M $LiPF_6$/EC-EMC (3:7 by wt.)+2 wt. % VC and 1 M LiFSI/EMC+3 wt. % LiDFOB electrolytes. The cells have an areal capacity loading of ~2.5 mA h $cm^{-2}$, anode/cathode ratio of ~1.1, and are discharged at constant 0.50 mA $cm^{-2}$. 1C is equal to 2.5 mA $cm^{-2}$ herein.

The fast-discharging capability of graphite|$LiNi_{0.94}Co_{0.06}O_2$ pouch cells with the baseline $LiPF_6$/EC-based and LiFSI/EMC-based electrolytes was measured at both ambient and low temperature (25° and 0° C.), as shown in FIG. 10 and FIG. 11. The cell with the LiFSI/EMC-based electrolyte achieved excellent rate capability, retaining above 99% and 90% capacities (compared to that at C/10, FIG. 10; 1C ~180 mA $g^{-1}$) at 1C and 10C, respectively. In FIG. 11, voltage polarization for the modified cell is considerably smaller than the baseline cell as well, and around 80 mA h $g^{-1}$ capacity was still obtained at a very high current rate (80C, full discharge in 45 seconds). At −20° C., the cell undergoes a minor energy loss under 2C rate, which outperforms the cell containing the $LiPF_6$/EC-based electrolyte. As for the fast-charging capability, no significant anode Li plating was detected for the full cell with the EC-free electrolyte (e.g., Coulombic efficiency ≥99.8%), at least up to 3.5 mA $cm^{-2}$ (equivalent to 1.4 C) at 0° C. (FIG. 12). On the other hand, the $LiPF_6$/EC-based cell showed signs of Li plating when the charge rate increased from 1.25 to 2.5 mA $cm^{-2}$ or more (0.5C to 1C rate or more). The areal capacity loading here was ~2.5 mA h $cm^{-2}$; close to values in commercial cells.

Figure 5:
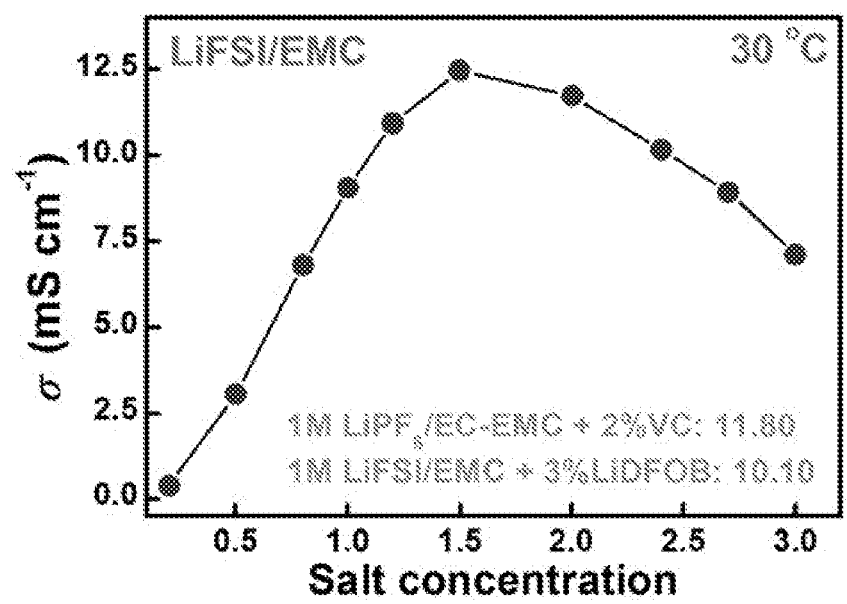
FIG. 5 shows the ionic conductivity of LiFSI/ethyl methyl carbonate (EMC) solutions as a function of salt molar concentrations at 30° C. The ionic conductivity of the baseline LiPF$_6$/EC-based and LiFSI/EMC-based electrolytes is also shown.
Figure 13:
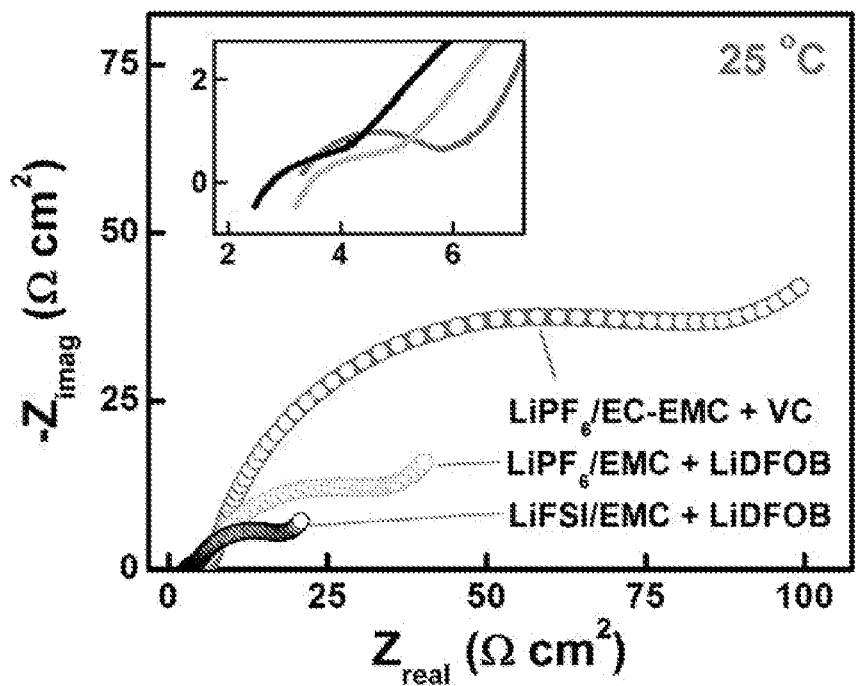
FIG. 13 shows the impedance spectra (Nyquist plots) at the 20th cycle (discharged to 2.5 V) of $LiNi_{0.94}Co_{0.06}O_2$ in pouch-type graphite full cells in $LiPF_6$/EC-based (2 wt. % VC), $LiPF_6$/EMC-based (3 wt. % LiDFOB), and LiFSI/EMC-based (3 wt. % LiDFOB) electrolytes. The inset shows magnified semicircles at the ultrahigh-frequency region.

The enhanced cell reaction kinetics with the LiFSI/EMC-based electrolyte described herein can be ascribed to multiple reasons. To begin with, as mentioned above, the $LiNi_{0.94}Co_{0.06}O_2$ sample possesses intrinsic good electronic/ionic conductivities with a minimal degree of Li/Ni mixing. The LiFSI/EMC-based carbonate solution also has low viscosity and high ionic conductivity (FIG. 5). Further, as indicated in FIG. 13, the cell internal resistance, which is critical for power capability, is significantly smaller for those containing the LiFSI/EMC-based electrolyte. This can in part be understood by the removal of $LiPF_6$ from the electrolyte. The hydrolytic decomposition of $LiPF_6$ ($LiPF_6 \rightarrow LiF+PF_5$ and $LiPF_6+H_2O \rightarrow LiF+POF_3+2HF$) produces acidic species that can attack the active cathode material under electrochemical cycling. As a result, highly resistive surface deposits (such as LiF) can accumulate on the cathode surface and cause large impedance buildup.

Figure 14:
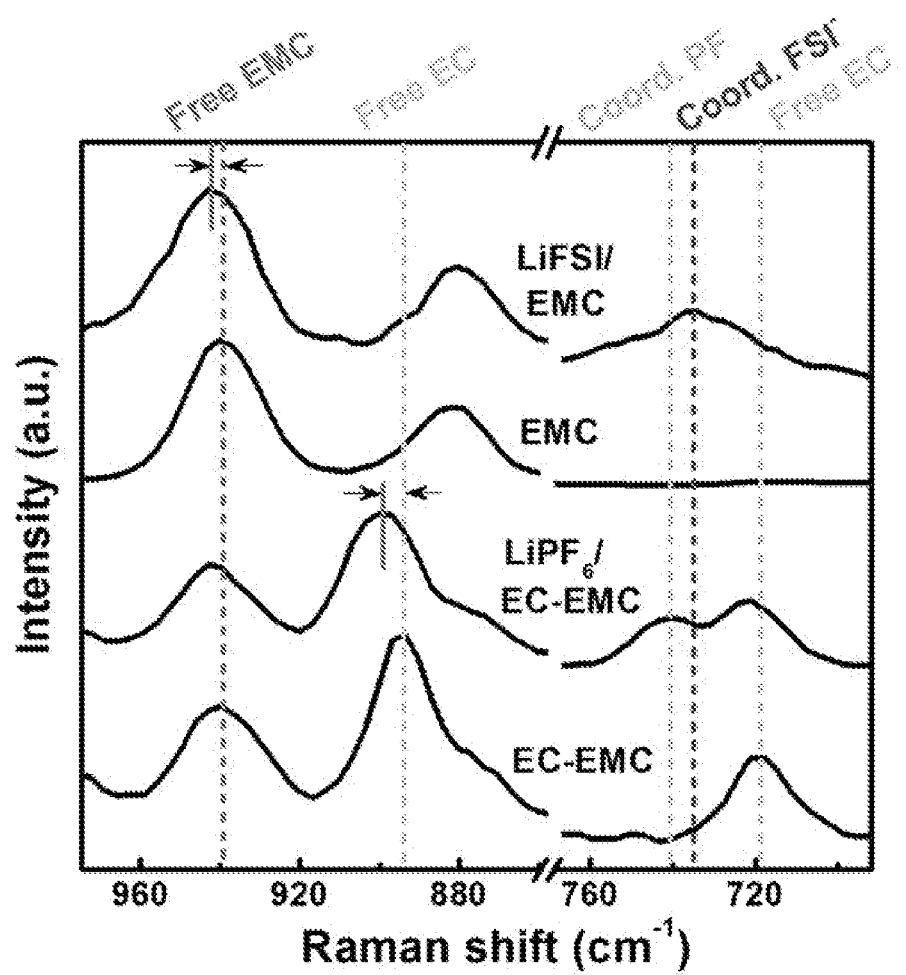
FIG. 14 shows Raman spectra of pure EMC, EC/EMC (3:7 by wt.), 1 M $LiPF_6$/EC-EMC (3:7 by wt.) and 1 M LiFSI/EMC solutions in the range of 965-850 $cm^{-1}$ and 760-685 $cm^{-1}$.

Moreover, coordination structures between Li ions and aprotic solvents can also be important, as the solvation/desolvation step is often the rate-determining step during rapid charge/discharge reactions. In FIG. 14, Raman spectroscopy was employed to distinguish ion coordination environments in the baseline $LiPF_6$/EC-based and LiFSI/EMC-based electrolytes.

The coordinated EMC vibrational band is less separated from the unperturbed band of pure EMC at ~940 $cm^{-1}$, in comparison to that of the coordinated EC from the pure EC band at ~895 $cm^{-1}$ (FIG. 14). This suggests a weaker Li-EMC interaction than that of Li-EC. In an EC-EMC solvent mixture, Li ions can be predominantly coordinated by EC molecules transporting in the bulk electrolyte solution. Thus, desolvation reactions in LiFSI/EMC-based electrolytes free of EC can be more facile.

Additionally, the surface passivating films (e.g., SEI) produced upon battery operation, derived primarily by LiFSI and LiDFOB rather than molecular solvents, can enable fast Li-ion diffusion. This can be confirmed both by the above impedance results in FIG. 13, and by post-mortem analysis on electrodes harvested from cycled pouch cells using surface-sensitive characterization techniques, which will be discussed in more detail in Example 4 below.

Figure 15:
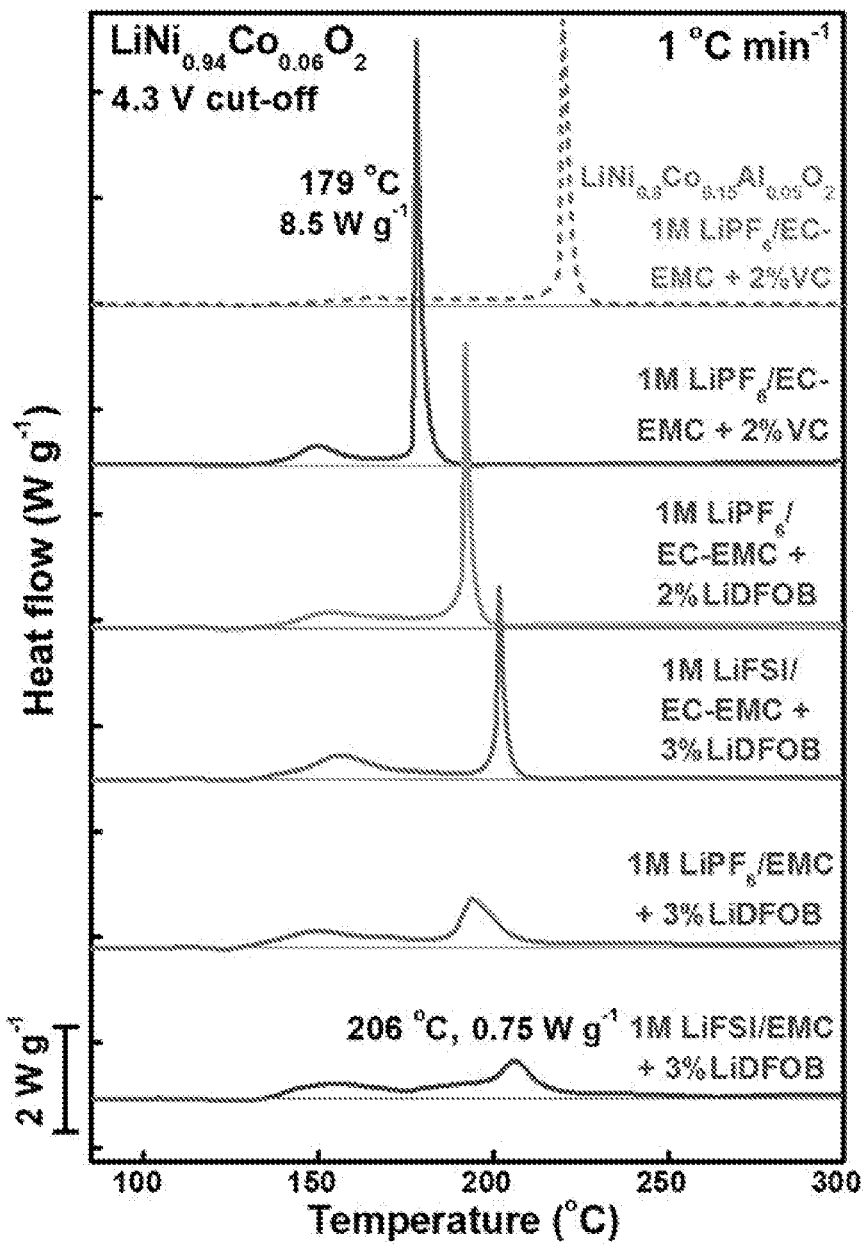
FIG. 15 shows the differential scanning calorimetry (DSC) profiles of the charged $LiNi_{0.94}Co_{0.06}O_2$ cathode in the presence of a handful of electrolyte combinations with a scan rate of 1° C. $min^{-1}$. The cathode samples were charged to 4.3 V vs. Li/Li. The DSC profile of charged $LiNi_{0.8}Co_{0.15}Al_{0.05}O_2$ mixed with the 1 M $LiPF_6$/EC-EMC (3:7 by wt.)+2 wt. % VC solution is also shown.

Example 3: Improved Safety of Delithiated Ni-Rich Cathode with the LiFSI/EMC-Based Electrolyte The thermal stability upon charging of $LiNiO_2$-based materials in the presence of nonaqueous electrolytes was evaluated by differential scanning calorimetry (DSC). FIG. 15 shows the DSC profiles of $LiNi_{0.94}Co_{0.06}O_2$ charged to 4.3 V vs. $Li^+/Li$ mixed with a series of electrolyte solutions (weight ratio of ~6:4). An explosive exothermic event reaching 8.5 W $g^{-1}$ occurs at 179° C. mixed with the baseline $LiPF_6$/EC-based electrolyte (2% VC by weight as an additive) (FIG. 15). This is due to the oxidation/combustion of flammable EC-EMC solvent mixture in the presence of released molecular oxygen from the delithiated Ni-rich layered oxide cathode upon heating. With the introduction of LiFSI and LiDFOB replacing $LiPF_6$ and VC, respectively, less intense thermal reactions occur at higher temperatures between delithiated $LiNi_{0.94}Co_{0.06}O_2$ and the EC-EMC solvent mixture (FIG. 15). However, the peak heat flow remains high (>3.5 W $g^{-1}$) and the corresponding temperature is still low (close to 200° C.) (FIG. 15).

On the other hand, as seen in FIG. 15, only mild exothermic reactions occurred during a prolonged period between $LiNi_{0.94}Co_{0.06}O_2$ mixed with EMC-only electrolytes. For the 1 M LiFSI/EMC solution with 3% LiDFOB by weight, the heat flow reached 0.75 W $g^{-1}$ at 206° C., which is more than one order of magnitude lower than that for the baseline electrolyte (1 M $LiPF_6$/EC-EMC with 2% VC; heat flow of 8.5 W $g^{-1}$). Although exothermic reactions still occurred at relatively low temperatures, the rate of heat release and total heat generation were greatly reduced. This allows sufficient time for heat dissipation, thereby potentially lowering the risk of thermal runaway.

A commercial cathode deployed in electric vehicles, $LiNi_{0.8}Co_{0.15}Al_{0.05}O_2$, was also examined in the baseline electrolyte via DSC (FIG. 15). Compared to the commercial cathode in the baseline electrolyte, decomposition of $LiNi_{0.94}Co_{0.06}O_2$ upon heating shows mitigated self-heating in the LiFSI/EMC-based electrolyte (FIG. 15).

Figure 16:
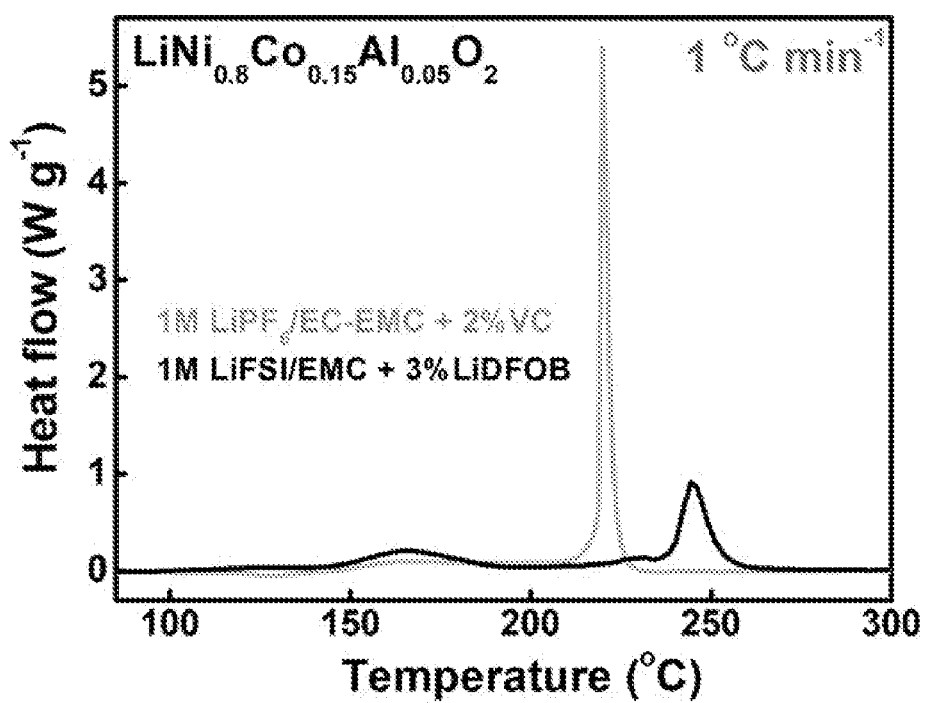
FIG. 16 shows the DSC profiles of the charged $LiNi_{0.8}Co_{0.15}Al_{0.05}O_2$ cathode (to 4.3 V vs. $Li^+$/Li) in the presence of 1 M $LiPF_6$/EC-EMC (3:7 by wt.)+2 wt. % VC and 1 M LiFSI/EMC+3 wt. % LiDFOB electrolyte solutions with a scan rate of 1° C. $min^{-1}$.

For delithiated $LiNi_{0.8}Co_{0.15}Al_{0.08}O_2$ mixed with the $LiPF_6$/EC-based and LiFSI/EMC-based electrolytes, similarly suppressed exothermic reactions were observed with higher onset temperature, inhibited local heating, and lowered total generated heat, as shown in FIG. 16. The improved thermal stability for $LiNi_{0.8}Co_{0.15}Al_{0.05}O_2$ mixed with the LiFSI/EMC-based electrolyte can be understood by the absence of EC in the electrolyte, as EC has a relatively high boiling temperature (243° C.). In contrast, EMC and other acyclic carbonate solvents have boiling temperatures below 150° C. Therefore, these solvents can evaporate from the cell through a safety vent reaching a threshold internal pressure, prior to the abrupt release of oxygen gas from the Ni-rich $LiNi_{1-x}M_xO_2$ cathode under abuse conditions (e.g., overcharge, heat). Meanwhile, the EC-containing electrolytes, such as those commonly used in the art, can react aggressively with the Ni-rich cathode, leading to potentially explosions.

The LiFSI/EMC-based electrolyte described herein does not contain any flame-retardant additives. With further modification of the electrolyte composition by incorporating flame-retardant additives, the thermal-abuse tolerance of $LiNiO_2$-based cathodes can be further improved.

Figure 17:
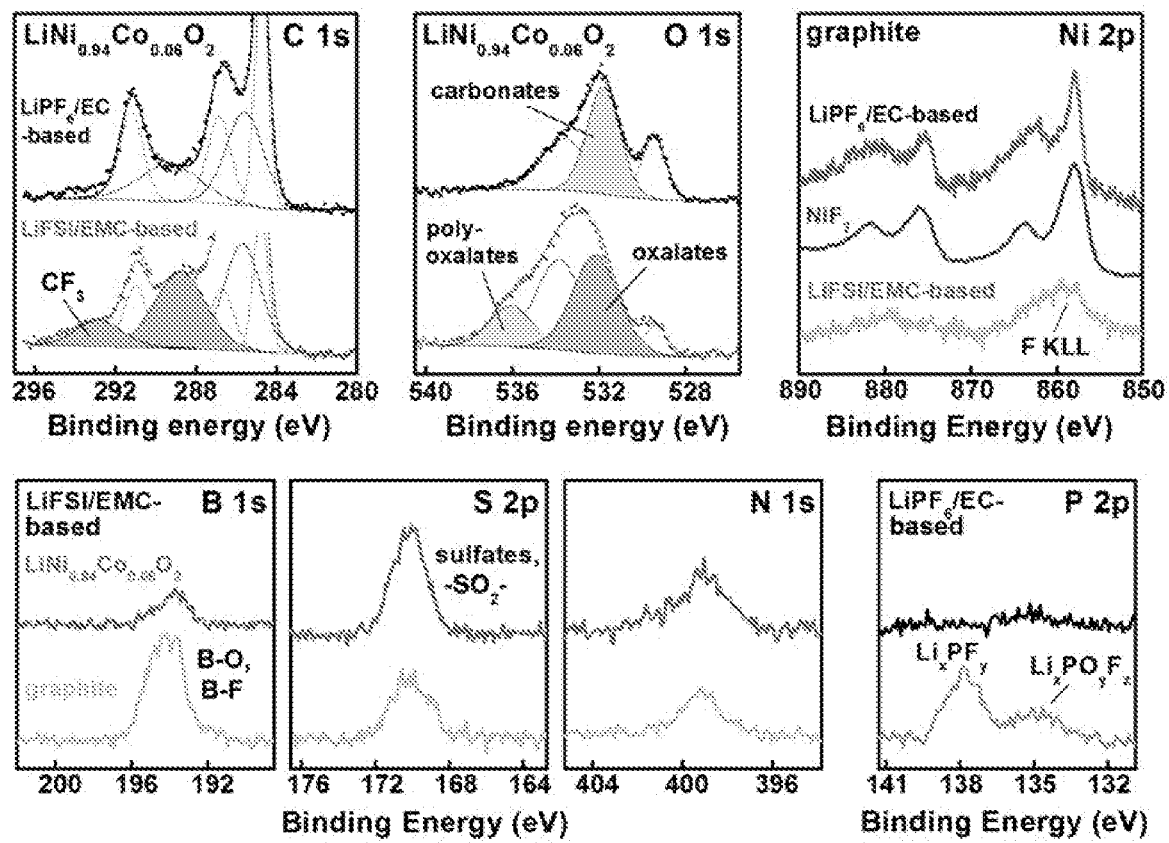
FIG. 17 shows the X-ray photoelectron spectroscopy (XPS) data (C 1s, O 1s, Ni 2p, B 1s, S 2p, and P 2p) acquired on $LiNi_{0.94}Co_{0.06}O_2$ and graphite electrodes harvested from pouch full cells after 100 cycles with the $LiPF_6$/EC-based (2 wt. % VC) and LiFSI/EMC-based (3 wt. % LiDFOB) electrolyte solutions.
Figure 18:
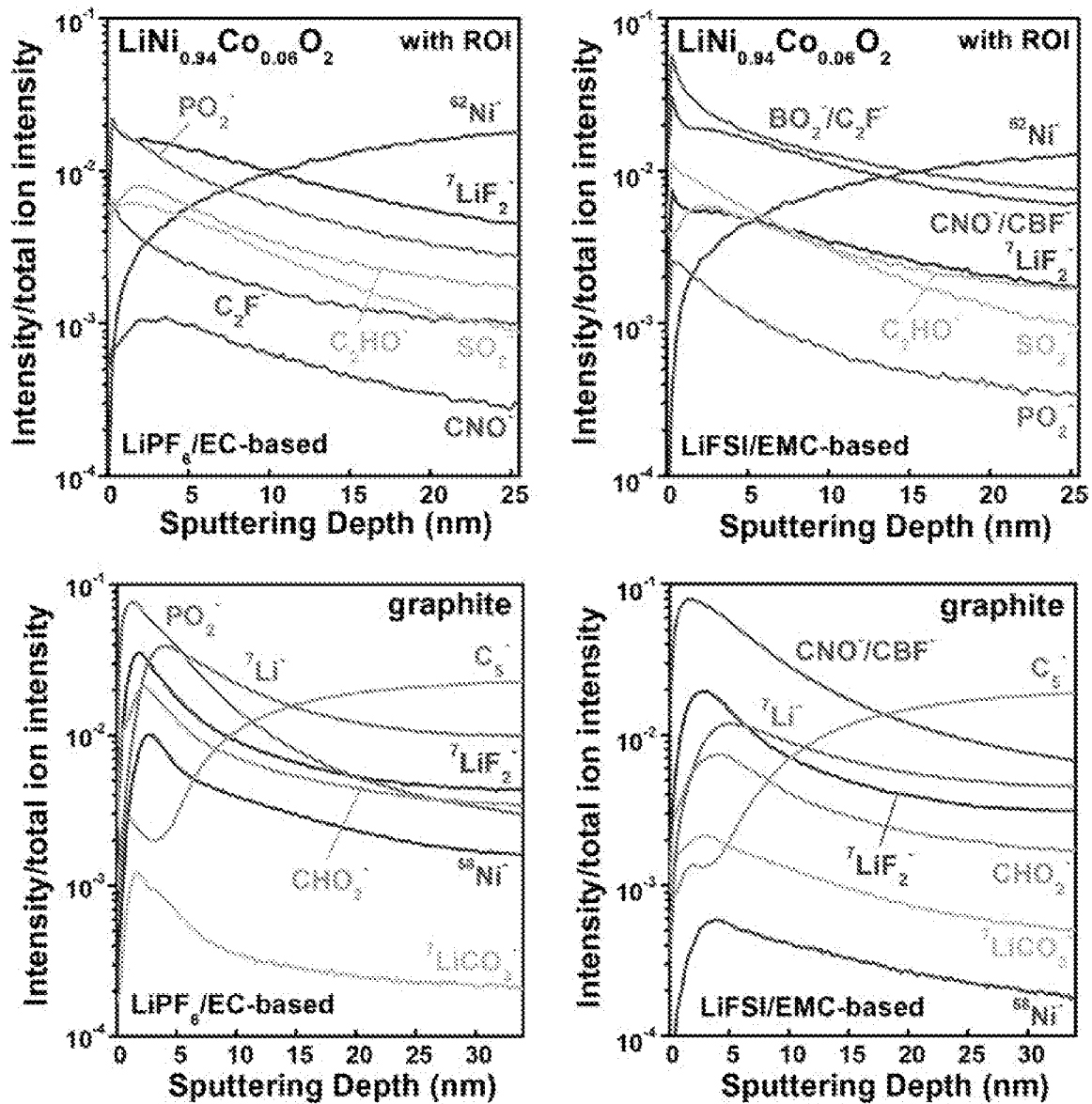
FIG. 18 shows time-of-flight secondary-ion mass spectrometry (TOF-SIMS) depth profiles with very high mass resolution acquired on $LiNi_{0.94}Co_{0.06}O_2$ (region-of-interest (ROI) selection applied) and graphite electrodes harvested from pouch full cells after 100 cycles with the $LiPF_6$/EC-based (2 wt. % VC) and LiFSI/EMC-based (3 wt. % LiDFOB) electrolyte solutions.

Example 4: Interfacial Chemistry of $LiNi_{0.94}Co_{0.06}O_2$ and Graphite with the LiFSI/EMC-Based Electrolyte The surface passivating films formed on the $LiNi_{0.94}Co_{0.06}O_2$ cathode and graphite anode under electrochemical cycling were characterized by X-ray photo-electron spectroscopy (XPS) and time-of-flight secondary-ion mass spectrometry (TOF-SIMS) in order to provide mechanistic insights into the improved cyclability and power density enabled by the LiFSI/EMC-based electrolyte described herein. FIG. 17 and FIG. 18 show, respectively, the XPS and TOF-SIMS data collected on harvested $LiNi_{0.94}Co_{0.06}O_2$ and graphite electrodes after 100 cycles in pouch full cells. Overall, the interfacial chemistry is dominated by decomposition products from both the LiFSI and LiDFOB salts upon electrochemical operation, rather than those from molecular solvents (i.e., EMC). In FIG. 17, there are several distinctive features, including oxalate groups, fluorinated alkane species, and polyoxalates, at the cathode surface in the LiFSI/EMC-based electrolyte. In FIG. 18, secondary-ion fragments, such as $BO^-$, $BO_2^-/C_2F^-$, $CN^-$, and $CNO^-/CBF^-$, show strong signal yields, which are in agreement with the XPS results in FIG. 17.

On the basis of the XPS and TOF-SIMS data, there exists a synergic effect between LiFSI and LiDFOB that leads to the formation of robust and stable surface passivating films on the $LiNi_{0.94}Co_{0.06}O_2$ cathode and graphite anode during cycling. The oxidation of the FSI and DFOB anions produces radicals such as $N·(SO_2F)_2$ and $F_2BOC·O$, which are strong Lewis acids. These radicals react strongly with the surface oxygen atoms on Ni-rich $LiNi_{1-x}M_xO_2$ materials at deeply delithiated states and form a highly interconnected polymer network that reduces or prevents unwanted electrode-electrolyte reactions. This is evidenced by the negligible amount of crossed over transition metal cations on cycled graphite dissolved from $LiNi_{0.94}Co_{0.06}O_2$ in the LiFSI/EMC-based electrolyte (FIG. 17 and FIG. 18). In contrast, the graphite in the $LiPF_6$/EC-based electrolyte shows intense Ni signal yields (FIG. 17 and FIG. 18). The robust and stable surface passivating films on both electrodes can substantially suppress electrolyte penetration and unwanted electrode-electrolyte reactions, therefore cell internal resistance can remain low and performance deterioration during aging can be mitigated. These results can also explain the superior cyclability and power density in Examples 1 and 2 above enabled by the LiFSI/EMC-based electrolyte systems.

Example 5

In spite of generally larger accessible charge-storage capacities with higher nickel incorporation in $LiNi_{1-x}M_xO_2$, commercial samples typically have nickel concentrations below 0.8 (x≥0.2). This is due to multiple problems associated with high-Ni compositions. To begin with, the pure Ni oxide is rarely stoichiometric and rather typically exists in a lithium-deficient phase $(Li_{1-x}Ni_{1+x}O_2)$. In this phase, a portion of the nickel ions remain as 2+ in their valence states. Due to the similar ionic radii of Ni(II) and Li(I), a 'cation mixing' phenomenon arises for Ni-rich $LiNi_{1-x}M_xO_2$, which refers to the existence of divalent nickel ions at lithium layers in its rhombohedral R3̄m structure. The cation mixing hurdles Li-ion motion within the host lattice and deteriorates high-rate performance of high-Ni samples. In addition, Ni-rich layer oxide cathodes suffer from rapid capacity and voltage degradation during cell operation in state-of-the-art $LiPF_6$/ethylene carbonate (EC)-based electrolytes. This is ascribed to aggressive side reactions occurring at the surface of cathode particles owing to incompatibility issues with the electrolyte, especially at highly delithiated states (high voltages). Specifically, nucleophilic attack on the ethylene carbonate solvent molecules from surface oxygen atoms of delithiated $Li_{1-x-y}Ni_{1+x}O_2$ causes ring opening and formation of decomposition products including carbonates, alkoxides and more. Acidic species (e.g. HF), produced by thermal or hydrolytic decomposition of the $LiPF_6$ salt, also attack the cathode particles (i.e., active mass dissolution). Further, delithiated $Li_{1-x-y}Ni_{1+x}O_2$ particles are prone to an irreversible surface phase transition process, during which the layered $R\bar{3}m$ structure is transformed into a $Fm\bar{3}m$ rock-salt phase. The structural reconstruction destroys active Li intercalation sites and impedes lithium diffusivity in the crystallographic framework. All of the processes mentioned above contribute to rapid performance degradation of $Li_{1-x}Ni_{1+x}O_2$ under electrochemical cycling in secondary Li-ion batteries. To circumvent these problems, nickel-based layered oxide cathodes are typically synthesized with a large amount of metal substitution in chemical composition, such as Co, Mn, Al and Mg (commercial samples including $LiNi_{1/3}Co_{1/3}Mn_{1/3}O_2$, $LiNi_{0.8}Co_{0.2}Mn_{0.3}O_2$ and $LiNi_{0.8}Co_{0.15}Al_{0.05}O_2$). As a rule, proper elemental substitution provides good layered ordering and enhanced electrode-electrolyte interfacial stability, though with a specific capacity penalty. Practical reversible capacities of commercial nickel-based cathode materials are typically in the range of 160-200 mA h $g^{-1}$.

The cathode material used for the experiments described herein was $LiNi_{0.94}Co_{0.06}O_2$, which has very high Ni concentration. This composition is expected to offer much higher capacity values than those currently in the Li-ion market. A small amount of cobalt is incorporated to reduce cation mixing and improve Li stoichiometry.

The ultrahigh-nickel cathode sample ($LiNi_{0.94}Co_{0.06}O_2$) is prepared through a transition-metal co-precipitation process, as illustrated in FIG. 1. During the synthesis (FIG. 1), a mixture of transition-metal sulfate solution (only $NiSO_4$ and $CoSO_4$ for manganese-free compositions) and alkali-metal hydroxide solution (KOH) are fed simultaneously into a continuously stirring tank reactor (CSTR) under carefully controlled temperature, pH, and stirring rate. Ammonia hydroxide ($NH_4OH$) is employed as a chelating agent to balance precipitate nucleation/growth rates during synthesis. After co-precipitation, the resulting hydroxide precursor $Ni_{0.94}Co_{0.06}(OH)_2$ is washed multiple times before drying at 100° C. overnight. The final product $LiNi_{0.94}Co_{0.06}O_2$ is obtained through heating the as-precipitated compound with a lithium salt ($LiOH·H_2O$) at a molar ratio of 1:1.05 at 640° C.

Figure 19:
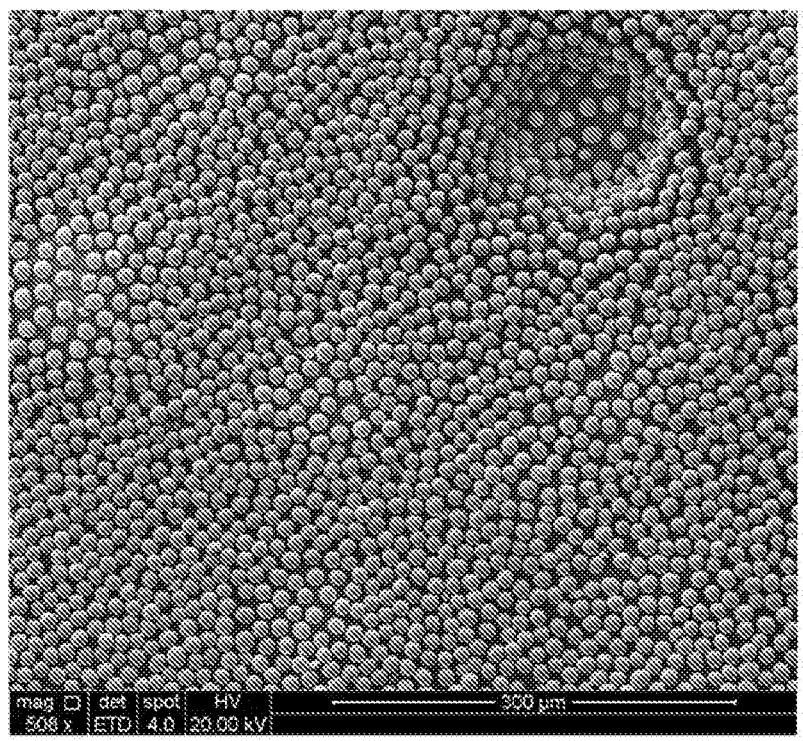
FIG. 19 is a scanning electron microscopy (SEM) image of as-prepared $Ni_{0.94}Co_{0.06}(OH)_2$, showing substantially uniform particle size and shape.
Figure 20:
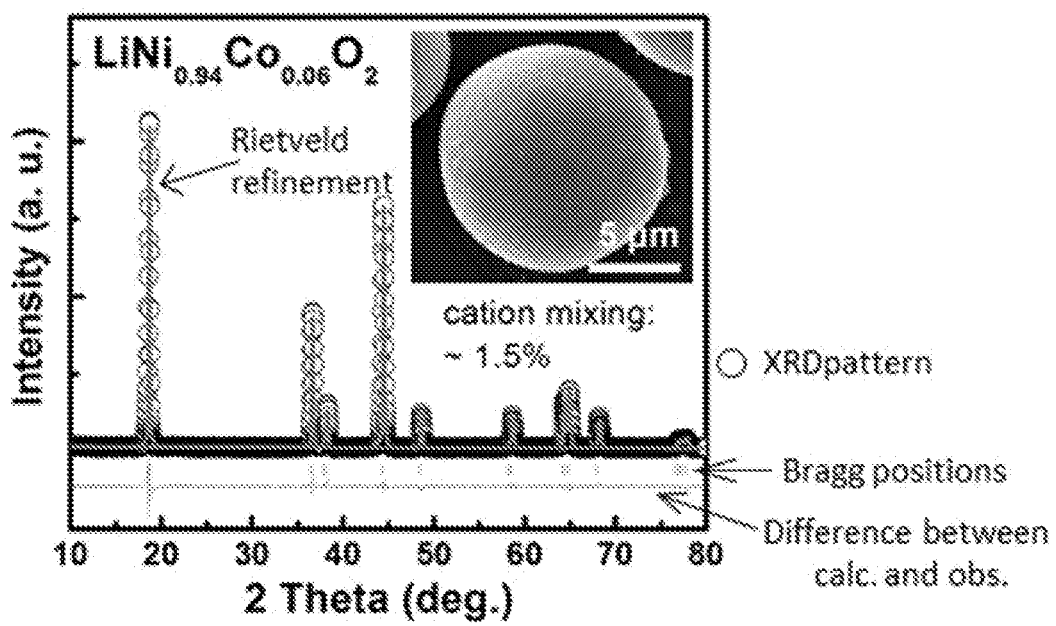
FIG. 20 shows the X-ray diffraction (XRD) pattern (circles) with Rietveld refinement, Bragg positions (vertical tick marks), and difference between the calculated pattern and observed data of $LiNi_{0.94}Co_{0.06}O_2$.

In FIG. 19, it can be seen that the $LiNi_{0.94}Co_{0.06}O_2$ sample comprises large, spherical particles with substantially uniform size distribution (~12-13 μm). As mentioned above, since performance degradation of this class of cathode materials primarily stems from the particle surface, a relatively small surface area with such particle morphology (~0.5 $m^2$ $g^{-1}$) is desired. Powder X-ray diffraction (XRD) pattern of pristine $LiNi_{0.94}Co_{0.06}O_2$ shows a well-defined $R\bar{3}m$ layered structure with the cation mixing of around 1.5%, as determined by Rietveld refinement (FIG. 20). Commercial materials often possess 2-3% cation mixing in spite of much lower nickel contents (≤0.7). The lower cation mixing in the $LiNi_{0.94}Co_{0.06}O_2$ cathode material can contribute to an improved rate capability.

Figure 21:
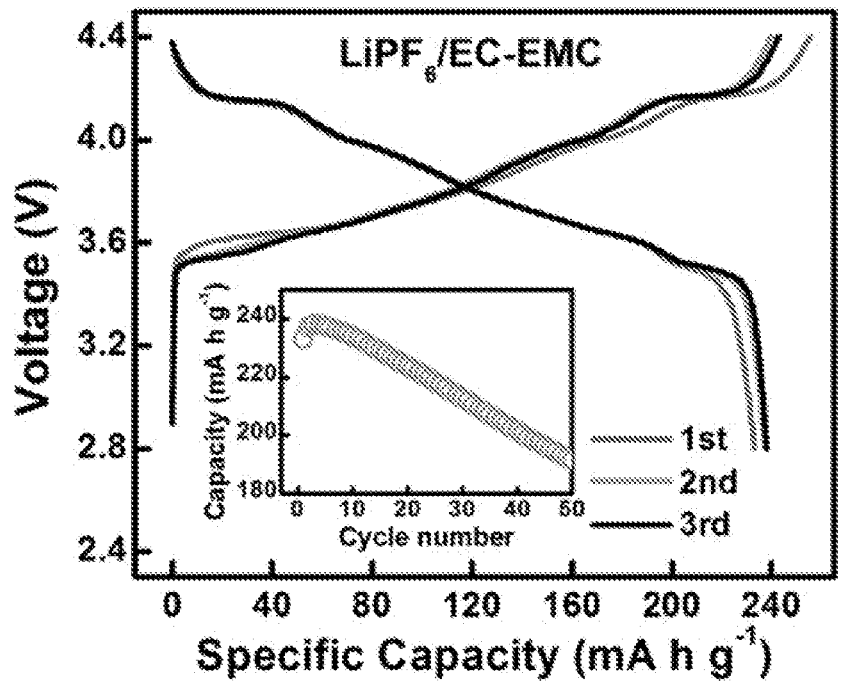
FIG. 21 shows the half-cell electrochemical characterization of $LiNi_{0.94}Co_{0.06}O_2$ via the voltage profiles during initial three charge-discharge cycles at C/5 under 40° C. in 2032 coin-type Li-metal half cells with baseline $LiPF_6$/ethylene carbonate (EC)-based electrolyte. 1C is equal to 180 mA $g^{-1}$ herein.

The electrochemical performance of the high-Ni cathode was recorded in lithium half cells at 40° C. FIG. 21 shows initial charge-discharge profiles of $LiNi_{0.94}Co_{0.06}O_2$ cycled between 2.8 and 4.4 V vs. $Li/Li^+$. The $LiNi_{0.94}Co_{0.06}O_2$ sample delivered a high gravimetric discharge capacity of almost 240 mA h $g^{-1}$, nearly 25% higher than commercial products. The $LiNi_{0.94}Co_{0.06}O_2$ material showed rather poor cycling stability in baseline $LiPF_6$/EC-based electrolytes, with roughly 20% capacity drop after mere 50 charge-discharge cycles. This is ascribed to various degradation processes discussed above. Thus, improvement on electrode-electrolyte interfacial compatibility is needed for high-nickel $LiNi_{1-x}M_xO_2$ (such as $LiNi_{0.94}Co_{0.06}O_2$) cathodes for their practical deployment.

Pouch-type full cells based on a $LiNi_{0.94}Co_{0.06}O_2$ cathode and Mesocarbon microbead (MCMB) graphite anode were assembled to test the electrolyte developed herein. The skeleton composition of commercial electrolyte used herein included one molar $LiPF_6$ dissolved in a solvent mixture of ethylene carbonate and ethyl methyl carbonate (3:7 by weight). In the field of Li-ion battery technology, desirable electrolyte systems should have the following properties: (i) high ionic conductivities, (ii) good chemical and electrochemical stability within the entire cell operating voltage window, (iii) low cost, (iv) safety (non-flammability), (v) large operating temperature range, and (vi) low viscosity and ease of handling. It is difficult to design an electrolyte that satisfies all the features above.

The state-of-the-art $LiPF_6$/EC-based electrolyte system possesses good conductivities at ambient temperature and a decent voltage stability window up to ~4.3 V vs. $Li/Li^+$. However, besides volatility and interfacial stability issues with high-Ni $LiNi_{1-x}M_xO_2$ mentioned above, commercial Li-ion cells with this class of electrolyte also suffer from severe energy and power loss at temperatures below 0° C. The necessary formation of a passivation surface film (i.e., solid electrolyte interphase, SEI) on commercial carbon anodes restricts the cell reaction kinetics, particularly during charging. Since the working potential of graphite anodes (~0.1-0.2 V vs. $Li/Li^+$) is not far from that of metallic Li deposition (0 V vs. $Li/Li^+$), fast charging of a lithium-ion full cell gives rise to significant anode over-potentials that drastically increase propensities of Li deposition. This process produces non-uniformly deposited metallic lithium dendritic or mossy structures with serious risks of short circuits and fire hazards associated with flammable organic electrolytes and other cell components. As a result, rapid charging of commercial Li-ion batteries beyond certain threshold values, which are dependent on their operating temperatures, is strictly prohibited due to safety concerns. For instance, it has been reported that, at 12° C., 30° C., and 50° C., anode Li deposition likely occurs at current rates beyond C/2, 1C, and 2C, respectively. One of many adverse implications of subzero-temperature operation of Li-ion batteries in the current $LiPF_6$/EC-based electrolyte is the mandatory slow charging (≤C/5). Consequently, alternative electrolyte systems with superior kinetic properties are also highly sought-after especially for applications in very demanding environments (e.g., space probes).

Figure 22:
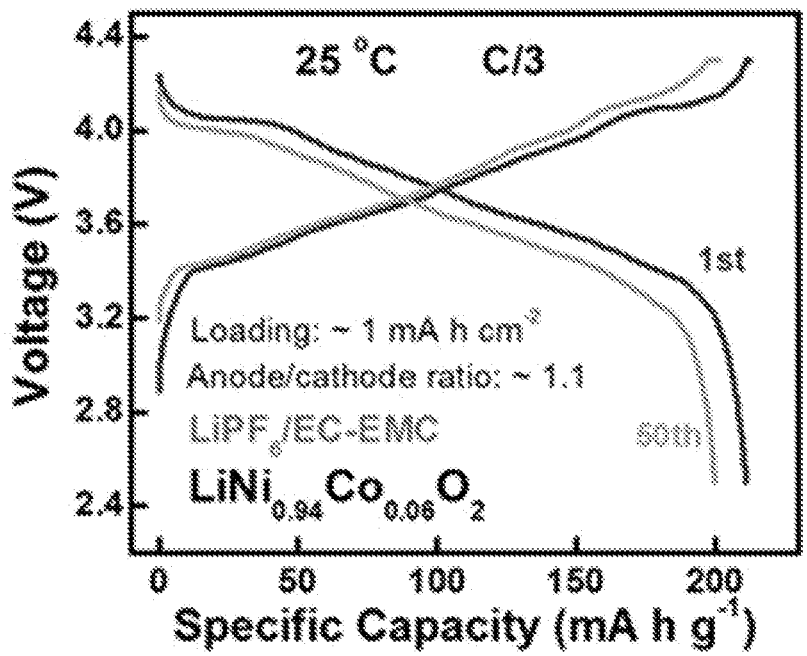
FIG. 22 shows the voltage profiles for $LiNi_{0.94}Co_{0.06}O_2$ in pouch-type graphite full cells during 100 cycles (after formation) in 1 M $LiPF_6$/EC-ethyl methyl carbonate (EMC) (3:7 by wt.). The cells have an active mass loading of approximately 4-5 mg $cm^{-2}$ (equal to ~1 mA h $cm^{-2}$), anode/cathode ratio of ~1.1, and are cycled between 2.5 and 4.3 V at C/3 under 25° C.
Figure 23:
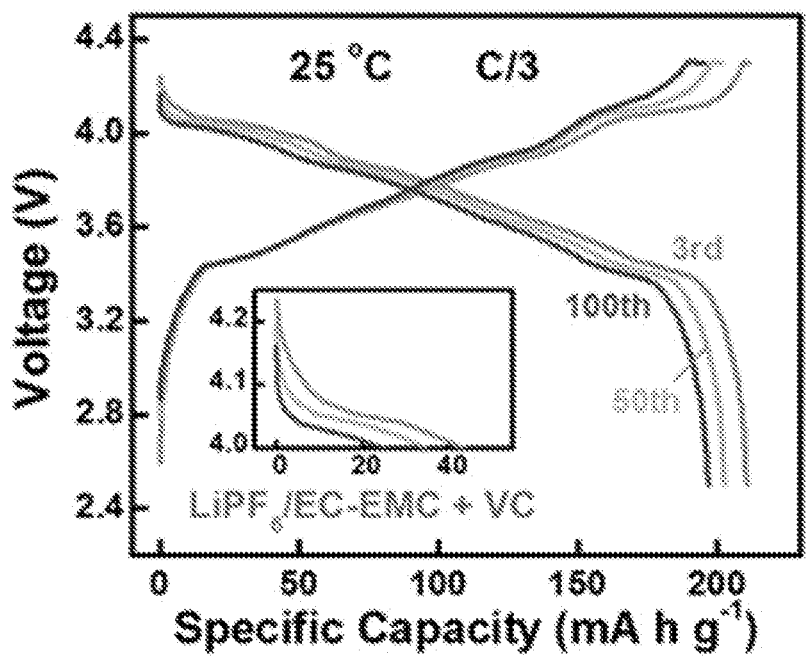
FIG. 23 shows the voltage profiles for $LiNi_{0.94}Co_{0.06}O_2$ in pouch-type graphite full cells during 100 cycles (after formation) in 1 M $LiPF_6$/EC-EMC (3:7 by wt.)+2% VC. The cells have an active mass loading of approximately 4-5 mg $cm^{-2}$ (equal to ~1 mA h $cm^{-2}$), anode/cathode ratio of ~1.1, and are cycled between 2.5 and 4.3 V at C/3 under 25° C.

Currently, the use of electrolyte additives in $LiPF_6$/EC-based skeleton composition is a major approach to improve battery service life and overall electrochemical performance. Vinylene carbonate (VC) is one of the most effective reducible additives in stabilizing lithium-ion cells at the commercial stage. In principle, these additives sacrificially decompose during early stages of battery operation (i.e., formation charge-discharge cycles), generating dense, uniform surface passivating films (interphases) with desired protection on both electrodes against parasitic electrolyte breakdown and other associated degradation processes during extensive cycling. This is demonstrated in FIG. 22 and FIG. 23. In addition to vinylene carbonate, many other functional additives are often used (alone or in combination) for optimized cell performance, such as fluoroethylene carbonate (FEC), lithium bis(oxalato)borate (LiBOB), prop-1-ene-1,3-sulton (PES) and tris(trimethylsilyl)phosphite (TMSP). This simple and straightforward approach is pursued in the battery industry with existing infrastructure producing large quantities of $LiPF_6$ and alkyl carbonates annually. However, the effectiveness of this approach is insufficient for many emerging high-energy-density Li-ion cathode candidates, including Li-stoichiometric nickel-rich layered oxides ($LiNi_{1-x}M_xO_2$, $x\leq0.3$) and Li-excess layered oxides ($Li_{1+x}M_{1-x}O_2$). This is can be attributed to the low anodic (oxidative) stability of ethylene carbonate at high voltages. To replace ethylene carbonate in state-of-the-art electrolyte skeleton composition, identifying component(s) that enable stable passivation of carbon anodes is essential. Herein, lithium difluoro (oxalate) borate (LiDFOB) is used as an additive to achieve this goal.

Figure 24:
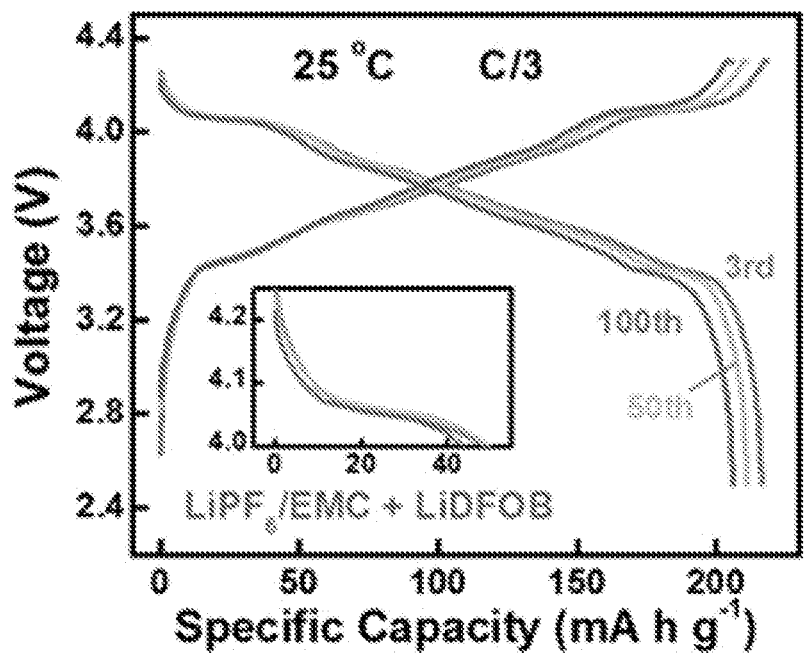
FIG. 24 shows the voltage profiles for $LiNi_{0.94}Co_{0.06}O_2$ in pouch-type graphite full cells during 100 cycles (after formation) in 1 M $LiPF_6$/EMC+2% LiDFOB. The cells have an active mass loading of approximately 4-5 mg $cm^{-2}$ (equal to ~1 mA h $cm^{-2}$), anode/cathode ratio of ~1.1, and are cycled between 2.5 and 4.3 V at C/3 under 25° C.
Figure 25:
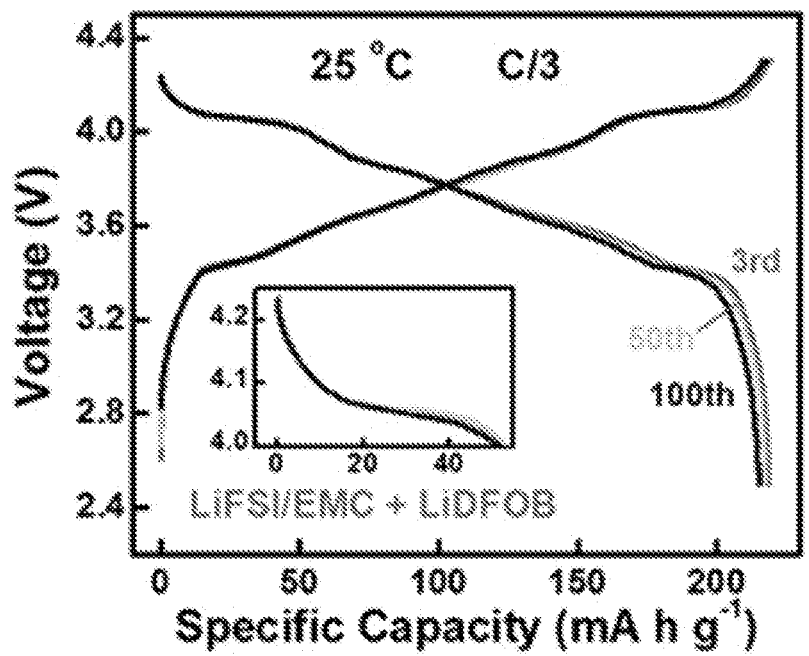
FIG. 25 shows the voltage profiles for $LiNi_{0.94}Co_{0.06}O_2$ in pouch-type graphite full cells during 100 cycles (after formation) in 1 M LiFSI/EMC+2% LiDFOB. The cells have an active mass loading of approximately 4-5 mg $cm^{-2}$ (equal to ~1 mA h $cm^{-2}$), anode/cathode ratio of ~1.1, and are cycled between 2.5 and 4.3 V at C/3 under 25° C.

LiDFOB, similar to LiBOB, has been shown to enhance the ethylene carbonate-derived solid electrolyte interphase stability on graphite and silicon anodes as well as anodic stability of aluminum cathode current collectors as an additive in $LiPF_6$/EC-based electrolytes. In addition, LiDFOB serves as a scavenger of acidic species (e.g., HF, produced by decomposition of $LiPF_6$) and readily decomposes at ~4.3-4.4 V vs. Li/Li$^+$, thereby forming surface deposits that passivate cathodes. LiDFOB also possesses several advantages over LiBOB, such as better solubility and Al passivation as well as reduced cell internal impedance contribution. As seen in FIG. 24, total removal of ethylene carbonate (1 M $LiPF_6$/EMC+2% LiDFOB) actually leads to improvement in cell capacity and voltage stability in comparison to the one containing both ethylene carbonate and VC (1 M $LiPF_6$/EC-EMC+2% VC, FIG. 23), especially at the high-voltage regime (>4 V vs. carbon). This suggests LiDFOB effectively passivates graphite anodes almost as well as ethylene carbonate, yet with much better compatibility with the high-Ni cathode ($LiNi_{0.94}Co_{0.06}O_2$). Subsequently, total removal of $LiPF_6$ is also enabled by LiDFOB with excellent aluminum substrate passivation even at low concentrations. Another salt, lithium bis (fluorosulfonyl) imide (LiFSI) is introduced herein, replacing $LiPF_6$ for its superior ionic conductivity, low cell impedance contribution, and stability against hydrolysis during cycling. This further improves the cyclability of $LiNi_{0.94}Co_{0.06}O_2$ (FIG. 25).

Figure 26:
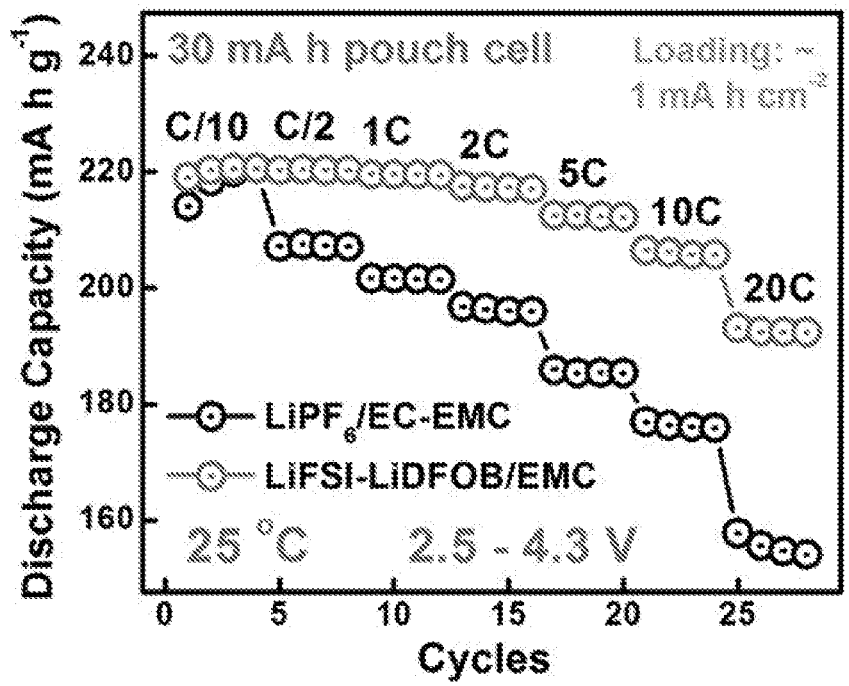
FIG. 26 shows the evolution of specific discharge capacity of $LiNi_{0.94}Co_{0.06}O_2$ in pouch-type graphite full cells with 1 M $LiPF_6$/EC-EMC (3:7 by wt.) and 1 M LiFSI/EMC+2% LiDFOB electrolytes at discharge current rates varying from C/10 to 20C. The cells have an active mass loading of ~1 mA h $cm^{-2}$, anode/cathode ratio of ~1.1, and are charged at a constant rate of C/2 and held at 4.3 V until the current drops to C/10. 1C=180 mA $g^{-1}$.
Figure 27:
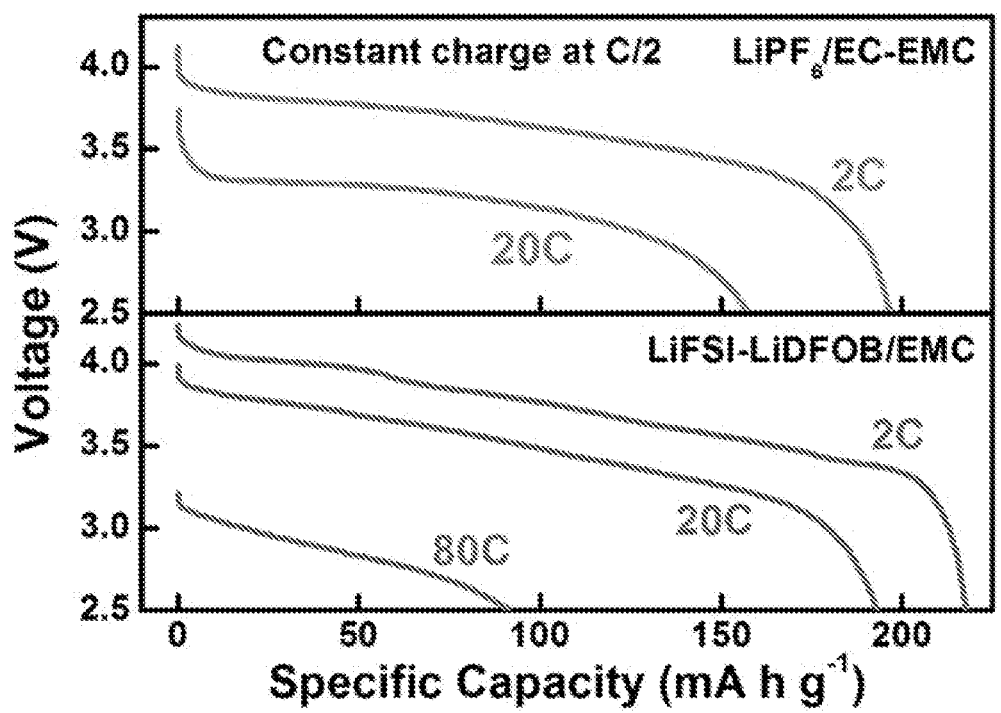
FIG. 27 shows the discharge profiles at 2C, 20C and 80C for $LiNi_{0.94}Co_{0.06}O_2$ in pouch-type graphite full cells with 1 M $LiPF_6$/EC-EMC (3:7 by wt.) and 1 M LiFSI/EMC+2% LiDFOB electrolytes measured at 25° C. The cells have an active mass loading of ~1 mA h $cm^{-2}$, anode/cathode ratio of ~1.1, and are charged at a constant rate of C/2 and held at 4.3 V until the current drops to C/10. 1C=180 mA $g^{-1}$.

In addition to enhanced cathode-electrolyte compatibility, the ethylene carbonate-free electrolyte described herein also exhibits excellent kinetic properties under electrochemical cycling. High-rate performance of pouch cells based on the $LiNi_{0.94}Co_{0.06}O_2$ cathode and MCMB graphite anode impregnated with baseline $LiPF_6$/EC-based and ethylene carbonate-free electrolytes are measured at room temperature (25° C.), as shown in FIG. 26-FIG. 27. The LiFSI-LiDFOB/EMC cell delivered excellent rate capability, retaining above 99% and 90% capacities (compared to that at C/10, FIG. 26) at 1C and 10C, respectively. In FIG. 27, voltage polarization for the LiFSI-LiDFOB/EMC cell is considerably smaller than the $LiPF_6$/EC-EMC cell as well, and around 90 mA h g$^{-1}$ capacity was still obtained at a very high current rate (80C, full discharge within mere 45 seconds).

These results can be ascribed to multiple reasons. To begin with, as mentioned above, the $LiNi_{0.94}Co_{0.06}O_2$ sample possesses intrinsic good electronic/ionic conductivities with a minimal degree of Li/Ni mixing. This is demonstrated here by the rate performance of the $LiPF_6$/EC-EMC cell, though inferior to the cell with LiFSI-LiDFOB/EMC electrolyte, still outperforming most literature results (~175 mA h g$^{-1}$ at 10C and 155 mA h g$^{-1}$ at 20C, respectively). The LiFSI-based carbonate solution has low viscosity and high ionic conductivity (reported to be around 12-15 mS cm$^{-1}$ with one molar concentration at room temperature). Further, $LiPF_6$ can induce large internal cell impedance, especially at the cathode side. Highly resistive surface deposits (such as LiF) are primarily responsible for the large impedance buildup, which arises from thermal or hydrolytic decomposition of $LiPF_6$ that generates acidic species ($LiPF_6 \rightarrow LiF+PF_5$ and $LiPF_6+H_2O \rightarrow LiF+POF_3+2HF$) with the presence of trace water impurities. The total removal of $LiPF_6$ in the LiFSI-LiDFOB/EMC solution results in suppressed internal impedance buildup during cycling.

Furthermore, coordination structures between Li ions and carbonate solvents are different in $LiPF_6$/EC-EMC and LiFSI-LiDFOB/EMC solutions, as the solvation/desolvation step is often the rate-determining step during rapid charge/discharge reactions of Li-ion batteries. In an EC-EMC mixture, Li ions can be predominantly coordinated by EC molecules ($[Li(EC)_4]^+$) transporting in the bulk electrolyte solution. The higher the binding energy between Li$^+$ and aprotic polar solvent molecules (~4.3 eV for $[Li(EC)_4]^+$ based on density functional theory (DFT) calculations), the larger the energy barrier for Li-ion desolvation and subsequent intercalation into the electrodes (and hence the more sluggish lithiation kinetics) is observed. Given the weaker interactions between Li$^+$ and ethyl methyl carbonate, lithium solvation/desolvation becomes more facile for the LiFSI-LiDFOB/EMC electrolyte. Additionally, the new interphases formed on graphite anodes from the DFOB$^-$ anion can enable fast Li-ion diffusion. This can be confirmed by post-mortem analysis on electrodes harvested from cycled pouch cells using advanced surface-sensitive characterization techniques.

Figure 28:
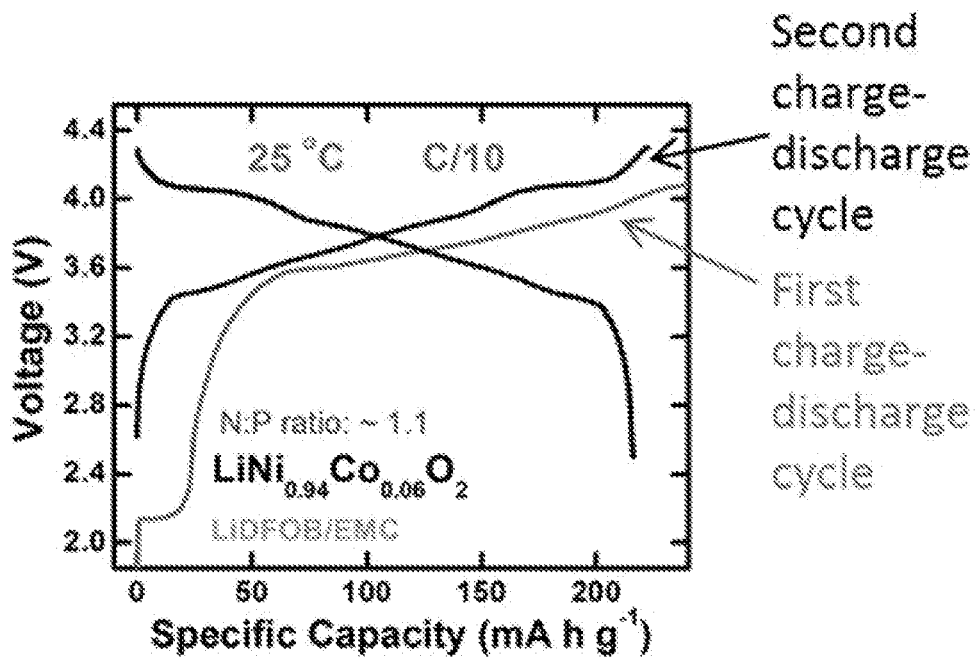
FIG. 28 shows the first-cycle irreversible capacity of $LiNi_{0.94}Co_{0.06}O_2$-based pouch full cells during formation with 1 M LiDFOB/EMC, 1.1 anode/cathode ratio.
Figure 29:
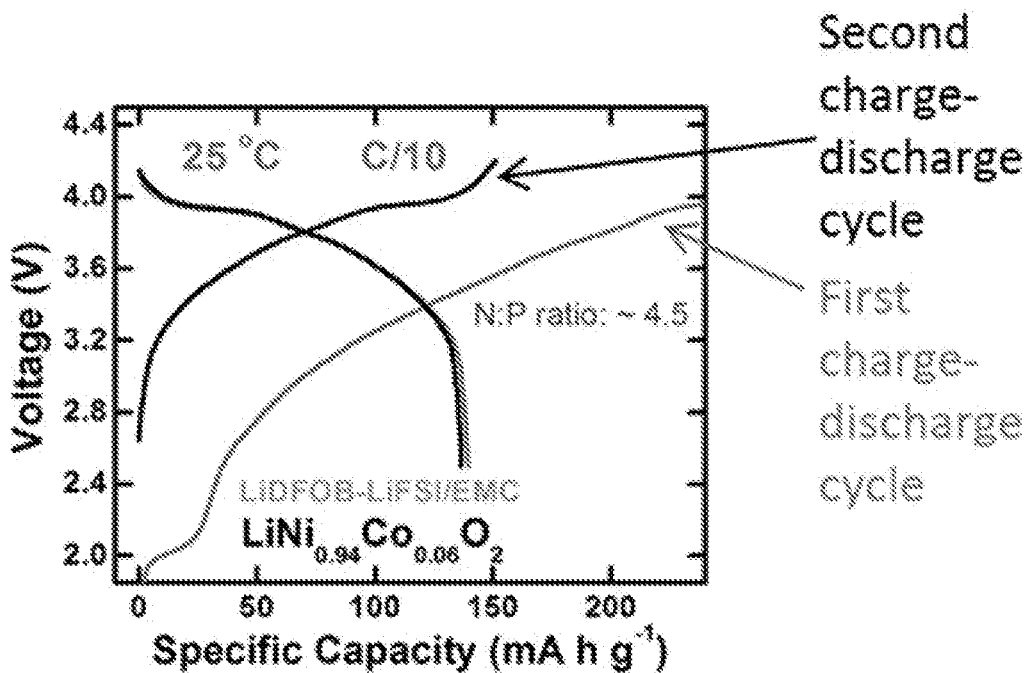
FIG. 29 shows the first-cycle irreversible capacity of $LiNi_{0.94}Co_{0.06}O_2$-based pouch full cells during formation with 1 M LiFSI/EMC+2% LiDFOB, 4.5 anode/cathode ratio.

The solid electrolyte interphase formation process on carbon anodes involving the reduction of ethylene carbonate through a single-electron pathway consumes a portion of active Li ions from oxide cathodes (an irreversible first-cycle capacity loss). Herein, because alternative interphase chemistry is generated at the surface of graphite, this phenomenon is analyzed in $LiNi_{0.94}Co_{0.06}O_2$-based pouch cells with varying electrolyte composition and anode/cathode ratios. FIG. 28 indicates the solid electrolyte interphase formation by DFOB$^-$ alone involves a voltage plateau at around 2.1 V upon the first charge. The reduction process of LiDFOB occurs at ~1.6-1.7 V vs. Li/Li$^+$, in agreement with FIG. 28. Despite a large capacity associated with solid electrolyte interphase formation (~20 mA h g$^{-1}$), the cell specific discharge capacity is virtually unaffected. On the other hand, one cell with a rather lopsided anode/cathode ratio (~4.5) indeed shows lower initial discharge capacity of ~138 mA h g$^{-1}$ (FIG. 29), which translates to approximately 12-13% irreversible capacity loss for cells with ideal anode/cathode ratios with this class of electrolytes. This value is very close to that of commercial $LiPF_6$/EC-based electrolytes. Thus, the passivation of carbon anodes by LiDFOB involves an initial irreversible capacity loss comparable to that of state-of-the-art LiPF$_6$/ethylene carbonate-based systems.

Figure 30:
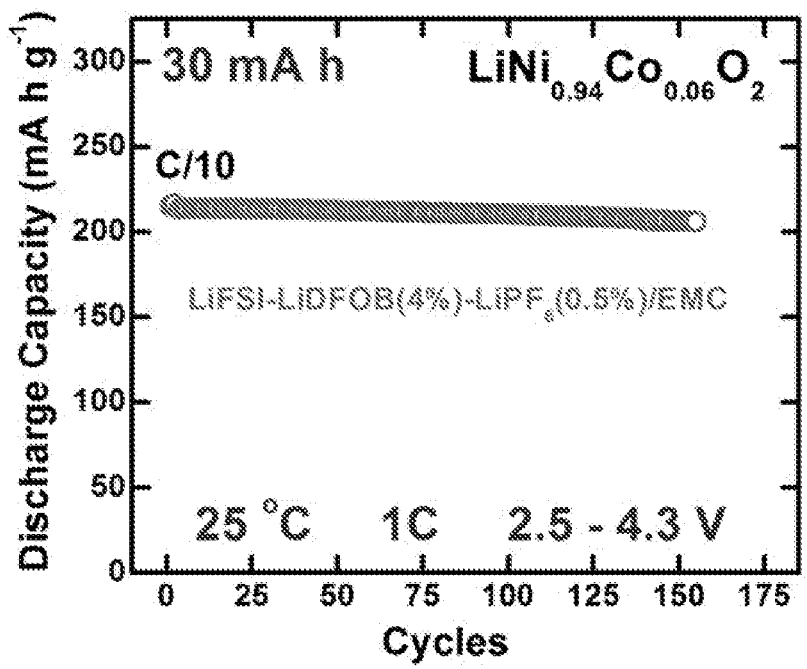
FIG. 30 shows the long-term cyclability of $LiNi_{0.94}Co_{0.06}O_2$-based pouch full cells in 0.8 M LiFSI/EMC+4% LiDFOB+0.5% $LiPF_6$. The cell underwent two formation cycles at C/10 and then cycled at 1C between 2.5 and 4.3 V under 25° C. Active material loading for the cathode is around 1 mA h $cm^{-2}$.

The long-term cycling stability of LiNi$_{0.94}$Co$_{0.06}$O$_2$-based pouch cells with the ethylene carbonate-free electrolyte is shown in FIG. 30. A trace amount of LiPF$_6$ (0.5%) is added for generating more dense and stable protective interphases on both electrodes. Since its addition is very small, the negative effects of LiPF$_6$ on cell stability mentioned above is believed to be trivial. The LiFSI-LiDFOB/EMC electrolyte system is only the skeleton composition similar to LiPF$_6$/EC-EMC, which can be further optimized. For instance, long-term cycling stability (>500 cycles), especially at elevated temperatures, can be addressed through identifying functional electrolyte additives to improve the stability of DFOB-derived solid electrolyte interphase, particular under influences of crossed over transition-metal cations dissolved from the cathode. Electrolyte salts/solvents either as additives (e.g., LiPF$_6$) or to replace one of the major components (e.g., lithium bis(trifluoromethanesulfonyl)imide (LiTFSI) for LiFSI and lithium salts containing boron-based functional groups for LiDFOB) could further optimize the overall electrochemical performance in commercial cell configurations.

Figure 31:
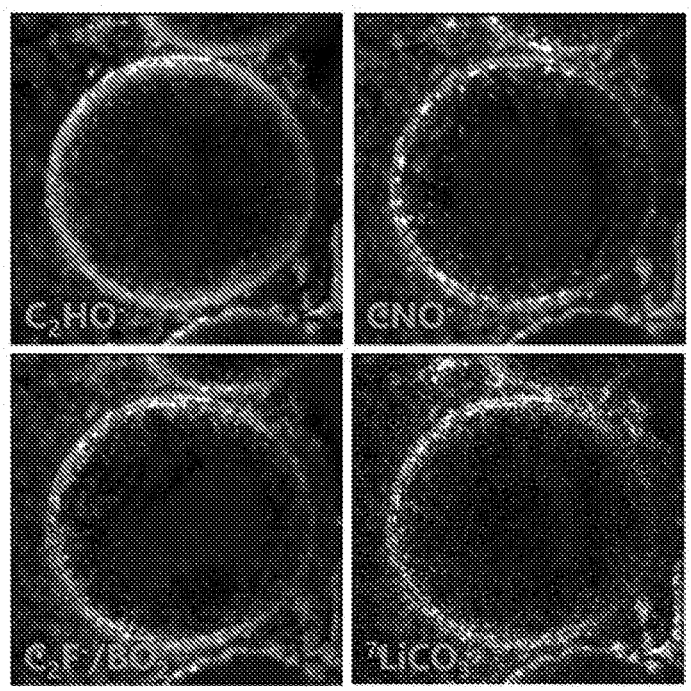
FIG. 31 shows the visualization of surface passivation by the ethylene carbonate-free electrolytes: time-of-flight secondary ion mass spectrometry (TOF-SIMS) mapping acquired on aged of $LiNi_{0.7}Co_{0.15}Mn_{0.15}O_2$ cathode particles in 1 M LiFSI/EMC+2% LiDFOB in 2032 coin-type graphite full cells under 25° C. for four weeks.

Preliminary analysis on the functioning mechanisms of the ethylene carbonate-free electrolyte systems described herein has been conducted and FIG. 31 depicts a series of mappings acquired on an aged nickel-rich sample (LiNi$_{0.7}$Co$_{0.1}$Mn$_{0.15}$O$_2$) via time-of-flight secondary ion mass spectrometry (TOF-SIMS). This sample was chosen for visualization purposes due to its large particle size (~25 m in diameter), in spite of different chemical composition from LiNi$_{0.94}$Co$_{0.06}$O$_2$. The working principles should be similar, as both samples have substantially identical crystal structures and high Ni incorporation fundamental to the electrode-electrolyte instability issues with state-of-the-art electrolytes. After aging in the 1 M LiFSI/EMC+2% LiDFOB solution for long periods of time, the cathode particles become clearly covered by decomposition products from both FSI$^-$ and DFOB$^-$ anions, as evidenced by TOF-SIMS mappings of several secondary-ion fragments of interest, including C$_2$HO$^-$, CNO$^-$, CF$_2^-$/BO$_2^-$, and $^7$LiCO$_3^-$ (FIG. 31). These signals represent a diversity of surface deposits including organic (semi)carbonates, oxalates, borates, and more.

The development of next-generation rechargeable lithium-ion batteries with high energy and power densities depends on overcoming severe cell stability challenges and improving compatibility between electrodes and the electrolyte. In addition, battery safety involving anode lithium plating can be important for their practical deployment. Herein, an electrolyte skeleton composition comprising lithium bis(fluorosulfonyl)imide (LiFSI) and lithium difluoro(oxalate)borate (LiDFOB) as the salts and ethyl methyl carbonate (EMC) as the solvent for high-energy lithium-ion batteries was described. The electrolyte composition can further include additional functional electrolyte additives. This class of electrolytes possesses several advantages over state-of-the-art LiPF$_6$/EC-based systems at the commercial stage, including (i) better chemical and electrochemical stability at high operating voltages, (ii) better kinetic properties at ambient and low temperatures and (ii) better compatibilities with certain high-energy electrode materials. The LiFSI-LiDFOB/EMC electrolyte was evaluated in pouch-type lithium-ion cells based on a high-capacity nickel-rich layered oxide cathode (LiNi$_{0.94}$Co$_{0.06}$O$_2$) and a commercial carbon anode. The cells show improved cyclability. This can be ascribed to the improved anodic (oxidative) stability of the electrolyte and passivation at the surface of both electrodes. Cells with the new electrolyte show enhanced kinetic properties. This can originate from: (i) superior ionic conductivity of the electrolyte, (ii) weak interactions with lithium ions by low-dielectric-constant and low-viscosity aprotic molecules in the electrolyte solution, (iii) low cell impedance, and (iv) excellent lithium diffusivity in the solid electrolyte interphase on carbon anodes. With the LiFSI-LiDFOB/EMC electrolyte, the cells can deliver improved resistance to anode lithium deposition in comparison to commercial electrolyte systems. This enhances battery safety with suppressed risks of short circuits and fire hazards associated with lithium dendrite growth.

The solid electrolyte interphase on carbon does not consume a large amount of active lithium ions from normal cell operation in the new electrolyte system. Thus, the LiFSI-LiDFOB/EMC electrolyte is compatible with emerging high-capacity electrode materials (e.g., silicon, tin, antimony, zinc, phosphorous, and lithium). All components used in the nonaqueous electrolyte are inexpensive and can be mass produced in the industry. The electrolyte is also compatible with commercial cell components, including cathode/anode current collectors, polymeric separators and laminated aluminum films.

In summary, the LiFSI-LiDFOB/EMC electrolyte was evaluated in pouch-type lithium-ion cells based on a high-capacity nickel-rich layered oxide cathode (LiNi$_{0.94}$Co$_{0.06}$O$_2$) and a commercial carbon anode. The cells show improved capacity and voltage retention during long-term cycling, excellent high-rate performance and superior resistance to anode lithium plating, especially at low temperatures. These achievements pave ways for commercialization of next-generation high-capacity electrode materials for lithium-ion batteries, including nickel-rich layered oxide cathodes and silicon-based composite anodes, and open a new paradigm for high-voltage electrolyte developments. The advantages of the new electrolyte system offer new opportunities for both methods and materials used for cathode protection and fast charging, and open new avenues for designing high-performance cathode materials for high-energy-density and safe lithium-ion battery systems.

Example 6

Disclosed are electrolytes comprising a lithium imide salt, an aprotic acyclic carbonate solvent, and an additive, wherein the additive comprises a metal salt, an aprotic solvent, or a combination thereof. The electrolytes can, for example, be used in electrochemical devices comprising a nickel-rich layered lithium transition-metal oxide (LiNi$_{1-x}$M$_x$O$_2$) cathode, a graphite anode, wherein the combination of these elements within the electrochemical device can provide certain improvements.

In some examples, the electrochemical devices can exhibit improved cyclability. The disclosed electrolytes comprising a lithium imide salt and a lithium borate salt in an aprotic acyclic carbonate solvent differ from conventional electrolytes comprising lithium hexafluorophosphate (LiPF$_6$) as the conducting salt dissolved in ethylene carbonate (EC) based solvents, thereby providing a robust protection mechanism of the cathode/anode against unwanted electrode-electrolyte reactions during cell operation. The disclosed lithium imide salts and lithium borate salts, and/or aprotic acyclic solvents together can produce robust surface passivating films on both the cathode and anode, which can reduce or prevent electrolyte penetration and unwanted side reactions.

In some examples, the electrochemical devices can exhibit enhanced safety under abuse conditions (e.g., overcharge, heat). The disclosed aprotic acyclic carbonate solvents can completely vaporize and escape from the electrochemical devices through a safety vent prior to the abrupt release of oxygen gas from delithiated Ni-rich $LiNi_{1-x}M_xO_2$ upon heating, thereby inhibiting or eliminating the total generated heat from violent exothermic reactions under abuse conditions.

In some examples, the electrochemical devices can exhibit improved power capability, especially at low temperatures. The disclosed electrolytes comprising a lithium imide salt and a lithium borate salt in an aprotic acyclic carbonate solvent can enhance cell reaction kinetics. The disclosed lithium imide salts can provide high Li-ion conductivity. The disclosed aprotic acyclic carbonate solvents can enable fast Li-ion motion in the bulk solution due to their low viscosity, and rapid Li-ion solvation/de-solvation kinetics during lithiation/delithiation reaction due to their weak interactions with solvated Li ions. The disclosed aprotic acyclic carbonate solvents freeze far below subzero temperatures, which enables superior low-temperature cell performance. The disclosed lithium imide salts, lithium borate salts, and/or aprotic acyclic carbonate solvents together can produce high Li-ion conductive surface passivating films on both the cathode and anode under electrochemical cycling.

Formation of the solid electrolyte interphase (SEI) on graphite does not consume a large amount of active lithium ions from normal cell operation in the new electrolyte system. Thus, the LiFSI/EMC-based electrolyte described herein may also be compatible with emerging high-capacity and/or high-power electrode materials (e.g., silicon, $Li_4Ti_5O_{12}$, tin, antimony, zinc, phosphorous, and lithium). All components used in the nonaqueous electrolyte are inexpensive and can be mass produced in the industry. The electrolyte is also compatible with commercial cell components, including cathode/anode current collectors, polymeric separators and laminated aluminum films.

In summary, the LiFSI/EMC-based electrolyte described herein was evaluated in pouch-type lithium-ion cells based on a high-capacity nickel-rich layered oxide cathode ($LiNi_{0.94}Co_{0.06}O_2$) and a commercial carbon anode. The cells show improved long-term cyclability, improved safety under abuse conditions, and improved power capability, especially at low temperatures. The advantages of the new electrolyte system offer new opportunities for both methods and materials used for cathode protection and fast charging, and open new avenues for designing high-performance cathode materials for high-energy-density and safe lithium-ion battery systems.

The advantages of the new electrolyte systems can offer new opportunities for both methods and materials used for cathode protection and fast charging, and open new avenues for designing high-performance cathode materials for high-energy-density and safe lithium-ion battery systems.

Other advantages which are obvious and which are inherent to the invention will be evident to one of ordinary skill in the art. It will be understood that certain features and sub-combinations are of utility and may be employed without reference to other features and sub-combinations. This is contemplated by and is within the scope of the following claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A lithium metal oxide cathode comprising:

$$Li_{S1}Ni_{1-S2-S3}Co_{S2}M_{S3}O_{s4}$$

wherein
$1 \leq S1 \leq 1.1$;
$0 \leq S2 \leq 0.04$;
$0.01 < S3 < 0.3$;
$2 \leq S4 \leq 2.2$;
$0.7 < 1-S2-S3 < 1$; and
M is selected from the group consisting of Mn, Al, Mg, Fe, Cr, B, Ti, Zr, Ga, Zn, V, Cu, Li, Na, K, F, Ca, Y, Nb, Mo, Ru, Rh, Ta, W, Ir, In, Tl, Sn, S, P, Cl, Sb, Te, Ce, and combinations thereof and M comprises at least Mn and Al,
wherein the lithium metal oxide cathode is configured to exhibit a specific discharge capacity in an electrochemical cell of from 180 mA h g$^{-1}$ to 350 mA h g$^{-1}$ at a current density of 180 mA g$^{-1}$.

2. The lithium metal oxide cathode of claim 1, comprising $LiNi_{1-S3}M_{S3}O_2$, wherein M is selected from the group consisting of Mn, Al, Mg, Fe, Cr, B, Ti, Zr, Ga, Zn, V, Cu, Li, Na, K, F, Ca, and combinations thereof, and M comprises at least Mn and Al.

3. An electrochemical cell comprising:
an anode;
a non-aqueous liquid electrolyte in electrochemical contact with the anode; and
a lithium metal oxide cathode in electrochemical contact with the non-aqueous liquid electrolyte, wherein the lithium metal oxide cathode comprises $Li_{S1}Ni_{1-S2-S3}Co_{S2}M_{S3}O_{s4}$, wherein
$1 \leq S1 \leq 1.1$;
$0 \leq S2 \leq 0.04$;
$0.01 < S3 < 0.3$;
$2 \leq S4 \leq 2.2$;
$0.7 < 1-S2-S3 < 1$; and
M is selected from the group consisting of Mn, Al, Mg, Fe, Cr, B, Ti, Zr, Ga, Zn, V, Cu, Li, Na, K, F, Ca, Y, Nb, Mo, Ru, Rh, Ta, W, Ir, In, Tl, Sn, S, P, Cl, Sb, Te, Ce, and combinations thereof and M comprises at least Mn and Al, and
wherein the lithium metal oxide cathode exhibits a specific discharge capacity of from 180 mA h g$^{-1}$ to 350 mA h g$^{-1}$ at a current density of 180 mA g$^{-1}$.

4. The lithium metal oxide cathode of claim 1, comprising a plurality of particles of the $Li_{S1}Ni_{1-S2-S3}Co_{S2}M_{S3}O_{s4}$.

5. The lithium metal oxide cathode of claim 4, wherein the plurality of particles have an average particle size of from 0.1 µm to 20 µm, wherein the plurality of particles are substantially monodisperse, or wherein the plurality of particles are substantially spherical in shape.

6. The lithium metal oxide cathode of claim 4, wherein the plurality of particles exhibit a size distribution in which 70% of the particles have sizes within 25% of a median particle size.

7. The lithium metal oxide cathode of claim 1, wherein $0<S3\leq0.45$.

8. The lithium metal oxide cathode of claim 1, having an active mass loading of the $Li_{S1}Ni_{1-S2-S3}Co_{S2}M_{S3}O_{s4}$ of from 1 mg cm$^{-2}$ to 50 mg cm$^{-2}$.

9. The lithium metal oxide cathode of claim 1, exhibiting a specific discharge capacity, in an electrochemical cell, of from 200 mA h g$^{-1}$ to 350 mA h g$^{-1}$ for a discharge cycle from 4.4 V to 2.8 V vs. Li/Li$^+$ at ambient temperature and a current density of 18 mA g$^{-1}$.

10. The lithium metal oxide cathode of claim 1, having a specific discharge capacity, in an electrochemical cell, of from 200 mA h g$^{-1}$ at a current density of 180 mA g$^{-1}$ over 100 charge/discharge cycles.

11. The lithium metal oxide cathode of claim 1, having a capacity retention, in an electrochemical cell, of 80% or more after 500 charge/discharge cycles at ambient temperature.

12. The electrochemical cell of claim 3, wherein the anode comprises graphite, silicon, lithium titanate ($Li_4Ti_5O_{12}$), tin, antimony, zinc, phosphorous, lithium, or a combination thereof.

13. The electrochemical cell of claim 3, wherein the non-aqueous liquid electrolyte comprises:
   a lithium imide salt;
   an aprotic acyclic carbonate solvent; and
   an additive, wherein the additive comprises a metal salt, an aprotic solvent, or a combination thereof;
   wherein the non-aqueous liquid electrolyte substantially excludes ethylene carbonate; and
   wherein the non-aqueous liquid electrolyte is stable at a voltage of 4.3 V or above vs. Li/Li$^+$.

14. The electrochemical cell of claim 13, wherein the lithium imide salt comprises lithium bis(trifluoromethanesulfonyl)imide, lithium bis(fluorosulfonyl)imide, lithium bis(fluorosulfonyl)imide, lithium (fluorosulfonyl)(nonafluorobutanesulfonyl)imide, lithium oligomeric fluorosulfonyl imide, or a combination thereof.

15. The electrochemical cell of claim 13, wherein the lithium imide salt comprises 1% by weight of the electrolyte or more.

16. The electrochemical cell of claim 13, wherein the aprotic acyclic carbonate solvent comprises ethyl methyl carbonate, diethyl carbonate, dimethyl carbonate, methyl propyl carbonate, dipropyl carbonate, methyl-2,2,2-trifluoroethyl carbonate, ethyl-2,2,2-trifluoroethyl carbonate, propyl-2,2,2-trifluoroethyl carbonate, di-2,2,2-trifluoroethyl carbonate, and combinations thereof.

17. The electrochemical cell of claim 13, wherein the additive comprises a metal salt and the metal salt comprises:
   a metal selected from the group consisting of Li, Na, K, Cs, Mg, Al, Zn, Ca, and combinations thereof;
   a metal borate salt, a metal phosphate salt, a metal aluminate salt, a metal arsenate salt, a metal antimonite salt, or a combination thereof;
   or a combination thereof.

18. The electrochemical cell of claim 13, wherein the additive comprises a lithium borate salt and the lithium borate salt comprises lithium tetrafluoroborate, lithium bis(oxalato)borate, lithium difluoro(oxalato)borate, lithium perfluoroethyl trifluoroborate, lithium (malonatooxalato)borate, lithium tetracyanoborate, lithium bis(polyfluorodiolato)borate, or a combination thereof.

19. The electrochemical cell of claim 13, wherein the additive comprises a metal salt comprising lithium hexafluorophosphate, sodium hexafluorophosphate, potassium hexafluorophosphate, cesium hexafluorophosphate, lithium hexafluoroarsenate, lithium hexafluoroantimonate, lithium tris(oxalato)phosphate, lithium tetrafluoro(oxalato)phosphate, lithium tris[1,2-benzenediolato(2-)-O,O']phosphate, or a combination thereof.

20. The electrochemical cell of claim 13, wherein the additive comprises a metal salt and the metal salt comprises from 0.01% to 30% by weight of the non-aqueous liquid electrolyte.

21. The electrochemical cell of claim 13, wherein the additive comprises an aprotic solvent comprising a carbonate, a carboxylate, a sulfone, a nitrile, a phosphorus-based solvent, a silicon-based solvent, an ether, or a combination thereof.

22. The electrochemical cell of claim 13, wherein the additive comprises an aprotic solvent and the aprotic solvent comprises from 0.01% to 95% by weight of the non-aqueous liquid electrolyte.

23. The electrochemical cell of claim 13, wherein the non-aqueous liquid electrolyte comprises a cyclic carbonate solvent in an amount of 10% by weight of the electrolyte or less.

24. The electrochemical cell of claim 13, wherein the non-aqueous liquid electrolyte comprises lithium bis(fluorosulfonyl)imide, lithium difluoro(oxalate)borate, and ethyl methyl carbonate.

25. The lithium metal oxide cathode of claim 1, further comprising a current collector in electrical contact with the $Li_{S1}Ni_{1-S2-S3}Co_{S2}M_{S3}O_{S4}$.

26. The electrochemical cell of claim 3, wherein the lithium metal oxide cathode exhibits a specific discharge capacity of from 200 mA h g$^{-1}$ to 350 mA h g$^{-1}$ for a discharge cycle from 4.4 V to 2.8 V vs. Li/Li$^+$ at ambient temperature and a current density of 18 mA g$^{-1}$.

27. The electrochemical cell of claim 3, wherein the lithium metal oxide cathode exhibits a capacity retention of 80% or more after 500 charge/discharge cycles at ambient temperature.

* * * * *